(12) United States Patent
Fujii et al.

(10) Patent No.: US 6,772,973 B2
(45) Date of Patent: Aug. 10, 2004

(54) SEAT BELT RETRACTOR

(75) Inventors: Hiroaki Fujii, Tokyo (JP); Koji Tanaka, Tokyo (JP); Hitoshi Fujita, Tokyo (JP); Koichi Furukawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/317,184

(22) Filed: Dec. 12, 2002

(65) Prior Publication Data

US 2003/0116669 A1 Jun. 26, 2003

Related U.S. Application Data

(62) Division of application No. 10/177,144, filed on Jun. 24, 2002, now Pat. No. 6,604,597, which is a division of application No. 09/484,450, filed on Jan. 18, 2000, now Pat. No. 6,427,935.

(30) Foreign Application Priority Data

| Jan. 19, 1999 | (JP) | 11-010184 |
| Jun. 21, 1999 | (JP) | 11-173624 |
| Dec. 15, 1999 | (JP) | 11-355334 |

(51) Int. Cl.[7] .............................................. B60R 22/46
(52) U.S. Cl. .................. 242/390.8; 242/374; 242/390.9
(58) Field of Search ........................ 242/390.8, 390.9, 242/374

(56) References Cited

U.S. PATENT DOCUMENTS

| 2,003 A | * | 3/1841 | Van Osdel | 416/17 |
| 3,189,296 A | * | 6/1965 | Wrighton et al. | 242/374 |
| 4,032,081 A | * | 6/1977 | Murnane | 242/383 |
| 4,099,683 A | * | 7/1978 | Stouffer et al. | 242/375.3 |
| 4,471,918 A | * | 9/1984 | Ando | 242/372 |
| 4,546,933 A | * | 10/1985 | Kanada et al. | 242/375.3 |
| 4,597,587 A | * | 7/1986 | Yoshitsugu et al. | 280/807 |
| 4,669,680 A | * | 6/1987 | Nishimura et al. | 242/375.3 |
| 4,896,844 A | * | 1/1990 | Gavagan et al. | 280/807 |
| 5,005,777 A | * | 4/1991 | Fernandez | 242/390.2 |
| 6,722,603 B1 | * | 4/2004 | Atencio | 242/390.8 |
| 2003/0209624 A1 | * | 11/2003 | Biller | 242/390.8 |

FOREIGN PATENT DOCUMENTS

| DE | 2511415 | * | 9/1976 | 242/375.3 |
| DE | 2914235 | * | 10/1979 | 242/375.3 |

* cited by examiner

*Primary Examiner*—Donald P. Walsh
*Assistant Examiner*—Daniel K Schlak

(57) ABSTRACT

A seat belt retractor includes a base frame, a spool having a spool shaft journalled to the base frame, a webbing wound around the spool, a return spring connected to the spool for winding the webbing by a return force thereof, a motor connected to the spool for winding the spool, and a speed-reduction mechanism interposed between the motor and the spool. The speed-reduction mechanism winds the webbing at a low speed for fitting the webbing to an occupant, and includes a contrate gear with a predetermined reduction gear ratio. Thus, the webbing is wound by operation of the motor via the contrate gear.

4 Claims, 22 Drawing Sheets

NON OPERATION OF SLIP MECHANISM

OPERATION OF SLIP MECHANISM

WEBBING WITHDRAWAL

OPERATION OF SECOND GEAR REDUCTION MECHANISM

OPERATION OF FIRST GEAR REDUCTION MECHANISM

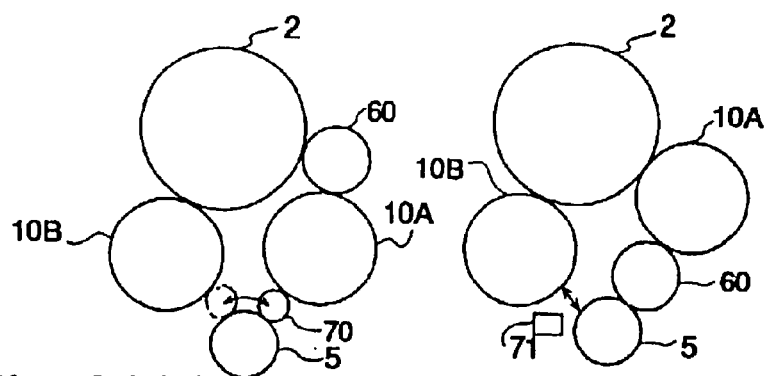
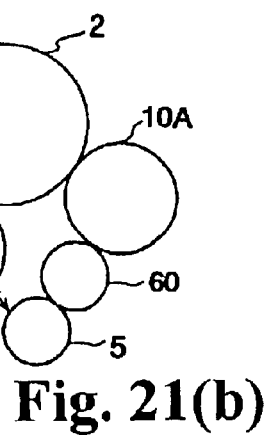
Fig. 21(a)   Fig. 21(b)
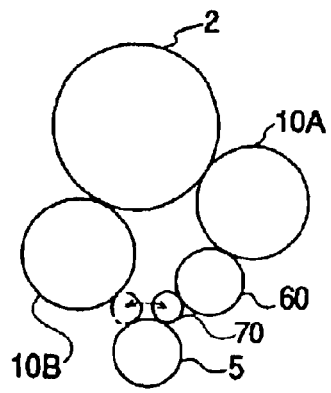
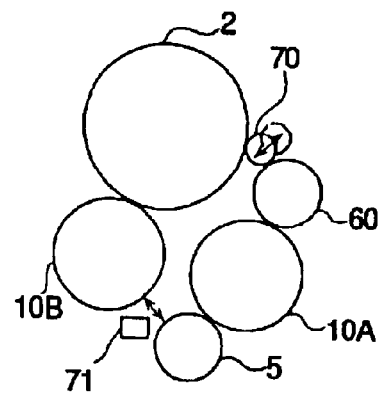
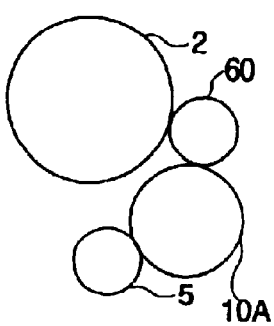
Fig. 21(c)   Fig. 21(d)   Fig. 21(e)

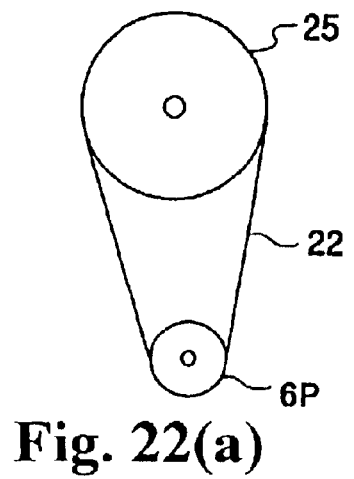
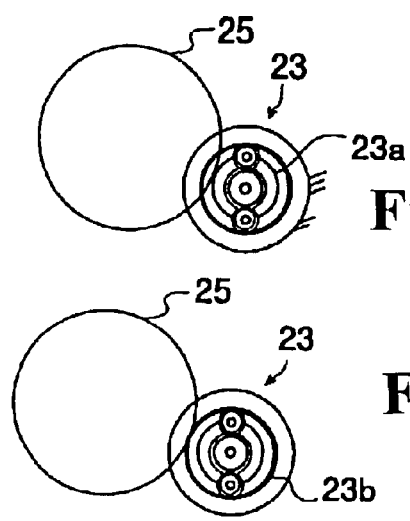
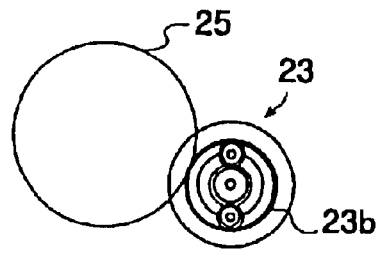
Fig. 22(a)  Fig. 22(b)  Fig. 22(c)
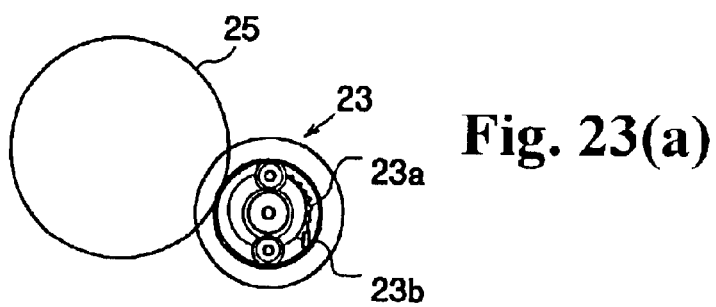
Fig. 23(a)
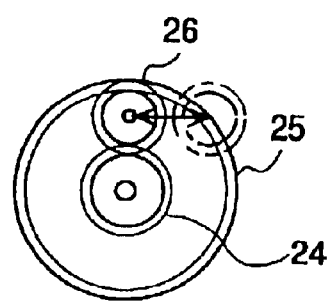
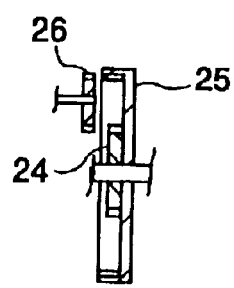
Fig. 23(b)  Fig. 23(c)

SEAT BELT RETRACTOR

CROSS-REFERENCE TO RELATED APPLICATION

This is a divisional application of Ser. No. 10/177,144 filed on Jun. 24, 2002, now U.S. Pat. No. 6,604,597, which is a divisional application of Ser. No. 09/484,450 filed on Jan. 18, 2000, now U.S. Pat. No. 6,427,935.

BACKGROUND OF THE INVENTION AND RELATED ART STATEMENT

The present invention relates to a seat belt retractor, and particularly, to a motorized seat belt retractor, which can change its operating condition to correspond to the state of an occupant wearing a seat belt or to external signals.

In a seat belt retractor provided in an automobile, it is preferable to retract an excess amount of a seat belt after the seat belt is pulled and a tongue is engaged with a buckle device, without applying too much stress to the chest or other portions of an occupant normally wearing the seat belt.

Normally used for winding up a seat belt in a seat belt retractor is a biasing force of a single return spring. When a spring providing a small biasing force is employed in order to reduce stress applied to the chest of an occupant, the force for winding or retracting the seat belt becomes weak, thus lowering its operation and its accommodation to the retracted state.

To the contrary, when a spring for providing a large biasing force is employed in order to provide an enough winding force for its retraction, the stress to be applied to the chest of the occupant normally wearing the seat belt is increased.

Since a single return spring is employed, a conventional seat belt retractor has a problem that the biasing force of the return spring increases as the amount of withdrawal of the webbing (hereinafter, the term "webbing" is used for referring to the belt itself in this specification) is increased because the return spring is repeatedly wound.

As one of means for solving the problem with regard to the winding of a webbing caused by using a single return spring, the applicant has developed a tension reducing mechanism for reducing the retraction force, which comprises two rope pulleys of truncated cone shape with a helical guide groove (see Japanese Patent No. 2711428).

On the other hand, the applicant also has developed a seat belt retractor in which a tension control for a seat belt is performed by a built-in electric motor to improve comfortableness as one of functions when an occupant normally wears, and to correspond to a distance from another vehicle running in front of or behind its own vehicle (see Japanese Unexamined Patent Publication No. H09-132113).

In the seat belt retractor disclosed in the aforementioned publication No. H09-132113, an ultrasonic motor is employed as a driving unit for the tension control and a spring mechanism is provided as a main winding mechanism. The motor is employed for controlling the tension on the seat belt when the occupant wears the seat belt, and for controlling the winding and unwinding of the seat belt to correspond to external signals inputted during running of the vehicle. Therefore, it is required to rotate the motor in reverse. This makes the control circuit Complex. Since the operation of winding up the seat belt is performed by two circuits, there is also a problem that it is hard to smoothly switch the operation of winding up the seat belt according to the inputted external signals.

When the external signals from sensors mounted on the vehicle are set to function as the trigger of the motor, a speed-reduction gear to be driven by the motor employed in the seat belt retractor can not cope with a wide range of a winding mode because the reduction range allowed by the speed-reduction gear is limited.

Therefore, it is an object of the present invention to solve the problems of the prior art and to provide a seat belt retractor in which a seat belt can be wound by only a motor with a simple control circuit and a driving mechanism, and the winding mode can be set widely to correspond to external signals inputted when an occupant wears the seat belt and a vehicle runs, and to provide a control method for the seat belt retractor.

Further objects and advantages of the invention will be apparent from the following description of the invention.

SUMMARY OF THE INVENTION

To solve the aforementioned problems, the present invention provides a seat belt retractor comprising: a base frame; a spool journalled at a spool shaft to the base frame; a speed-reduction mechanism; and a motor for rotating the spool via the speed-reduction mechanism for winding up a webbing onto the outer periphery of the spool. The speed-reduction mechanism has two transmission trains with different reduction gear ratios, switching means for switching the transmission trains to one of the trains corresponding to a driving signal obtained from external units, and resistant torque means having a preset value so that a transmission element common to the two trains transmits rotation of the motor when the torque of the rotation is smaller than the preset value.

The driving signal is preferably set according to a state signal obtained by movement of an occupant wearing the seat belt and an external signal obtained from detecting means installed in a vehicle during the running of the vehicle.

It is preferable that when the state signal is received, the rotational torque is reduced at a small reduction gear ratio to be smaller than the preset value of the resistant torque means, and the spool shaft is rotated with the reduced rotational torque for winding up the webbing.

It is preferable that when the external signal is received, the switching means switches the transmission trains so that the rotational torque is increased at a large reduction gear ratio to exceed the preset value of the resistant torque means to wind the webbing.

It is preferable in the above that the resistant torque means is a slip mechanism comprising a viscosity resistant element disposed on the trains of the speed-reduction mechanism.

It is also preferable that the switching between the trains is achieved by actuating the switching means according to the driving signal when the external signal is received and securing a part of the transmission element disposed in the speed-reduction mechanism.

It is preferable that the switching means comprises a pawl mechanism which engages one of ratchet teeth formed on the outer periphery of an internal gear in a planetary gear unit to stop the rotation of the internal gear.

It is also preferable that the switching means comprises a pawl mechanism having two pawls journalled by shafts, which cooperate to engage ratchet teeth of the internal gear to stop rotation of the internal gear.

In this case, it is preferable that the two pawls are a first pawl and a second pawl, and the first pawl pivots about the shaft by excitation of a solenoid to engage one of the ratchet teeth and, after that, the first pawl makes the second pawl to engage another of the ratchet teeth.

It is preferable that a spring connected to the first pawl biases the first pawl after cancelling the excitation of the solenoid with the result that the second pawl disengages from the ratchet teeth.

It is preferable that the rotation of the spool is reduced through a reduction gear train, and the spool shaft is provided with a spool rotation detecting unit for detecting a rotational direction and a stopping state of the spool.

It is preferable that the withdrawal of the webbing is detected by the start of rotation of the spool and acts as a trigger for turning ON a power source of a control circuit for driving the motor.

The present invention also provides, as another invention, a seat belt retractor comprising a base frame, a spool journalled at a spool shaft to the base frame, around which a webbing is wound, a return spring for winding up the webbing by its return force, and a motor with a speed-reduction mechanism for switching the winding of the webbing, wherein the speed-reduction mechanism has a transmission train with a predetermined reduction gear ratio and switching means for connecting the transmission train to the spool shaft corresponding to a driving signal obtained from an external unit.

The driving signal is preferably set according to a state signal obtained by movement of an occupant wearing the seat belt and/or an external signal obtained from detecting means installed in the vehicle during running of the vehicle.

It is preferable that when the external signal is received, the switching means switches the transmission trains so that the webbing is wound by the return spring at a large reduction ratio.

It is preferable that the switching of the transmission train is achieved by actuating the switching means according to the driving signal when the external signal is received, and securing a part of transmission elements disposed in the speed-reduction mechanism.

It is preferable that the switching means comprises a pawl mechanism which engages one of ratchet teeth formed on an outer periphery of an internal gear in a planetary gear unit to stop the rotation of the internal gear.

The present invention also provides, as a further invention, a seat belt retractor comprising: a base frame; a spool journalled at a spool shaft to the base frame around which a webbing is wound: a return spring for winding up the webbing by its return force: and a motor with a speed-reduction mechanism for winding up the webbing at a low speed for fitting the webbing to an occupant, wherein the speed-reduction mechanism has a contrate gear with a predetermined reduction gear ratio and wherein the webbing, is wound by driving the motor via the contrate gear.

The present invention also provides, as an invention for efficiently operating the above retractor, a control method of a seat belt retractor comprising: receiving an external signal outputted to correspond to a state signal according to the movement of an occupant wearing a seat belt and/or an external signal from detecting means installed in a vehicle during running of the vehicle; switching transmission of a rotational torque of a motor to a predetermined reduction ratio corresponding to the state signal or the external signal, or controlling the driving state of a motor to change its torque to a predetermined value to control the rotation of a spool; and winding the webbing onto the spool.

It is preferable that based on a state signal obtained by detecting withdrawal of the webbing while the webbing is in the wound state, the rotation of the motor is stopped.

It is preferable that based on a state signal obtained by detecting that a tongue is engaged with a buckle, the motor is driven with such torque as to wind the webbing to fit the webbing to the occupant's body.

It is preferable that based on a state signal obtained by detecting that the fitting of the webbing is accomplished, the torque of the motor is reduced or the drive of the motor is stopped.

It is preferable that based on a state signal obtained by detecting that the withdrawal of the webbing is cancelled, the motor is restarted to wind the webbing.

It is preferable that when the withdrawal of the webbing is made and stopped while a tongue is engaged with a buckle, the winding of the webbing is started to fit the webbing to the occupant and, after that, the torque of the motor is reduced or the drive of the motor is stopped.

It is preferable that the torque of the motor for fitting the webbing to the occupant is set lower than the torque of the motor for fitting the webbing to the occupant just after the tongue is engaged with the buckle.

It is preferable that based on a state signal obtained by detecting that a tongue is disengaged from a buckle, the motor is activated to wind the webbing into the retractor.

It is preferable that at the same time of or after a predetermined period of time from the detection of the withdrawal of the webbing, a power source of a control circuit for operating the motor is turned ON.

It is preferable that at the same time of detection that the winding of the webbing is accomplished, or detection that the webbing has not been withdrawn for a predetermined period of time, a power source of the control circuit for operating the motor is turned OFF.

It is preferable that the control method further comprises: switching the torque of the motor to a preset value or a variable value by switching means according to an obtained external signal to wind the webbing by the motor.

It is preferable that the control method further comprises: providing a mode in which the switching means is not returned so as to hold the driving state of the motor after being switched.

It is preferable that the control method further comprises: providing a mode in which the switching means is not returned so as to hold the driving state of the motor after being switched through torque resistor means of the speed-reduction mechanism.

It is preferable that the mode is a holding mode during running of the vehicle or a child seat fixing mode.

It is also preferable that the control method further comprises: transmitting a command signal of the motor corresponding to the external signal as information to be used for one or all of the seat belt retractors installed in vehicle seats in a communicating method capable of recognizing the seats so as to perform the mode setting for the vehicle seats.

BRIEF DESCRIPTION OF THE DRAWINGS

FIGS. 21(a)–21(e) are explanatory views schematically showing variations of the entire structure of the speed-reduction mechanism;

FIGS. 22(a)–22(c) are explanatory views schematically showing variations of a first reduction gear mechanism;

FIGS. 23(a)–23(c) are explanatory views schematically showing variations of a second reduction gear mechanism;

DETAILED DESCRIPTION OF PREFERRED EMBODIMENTS

Hereinafter, an embodiment of the seat belt retractor and the control method for carrying out the present invention will be described with reference to the accompanying drawings.

Figure 1:
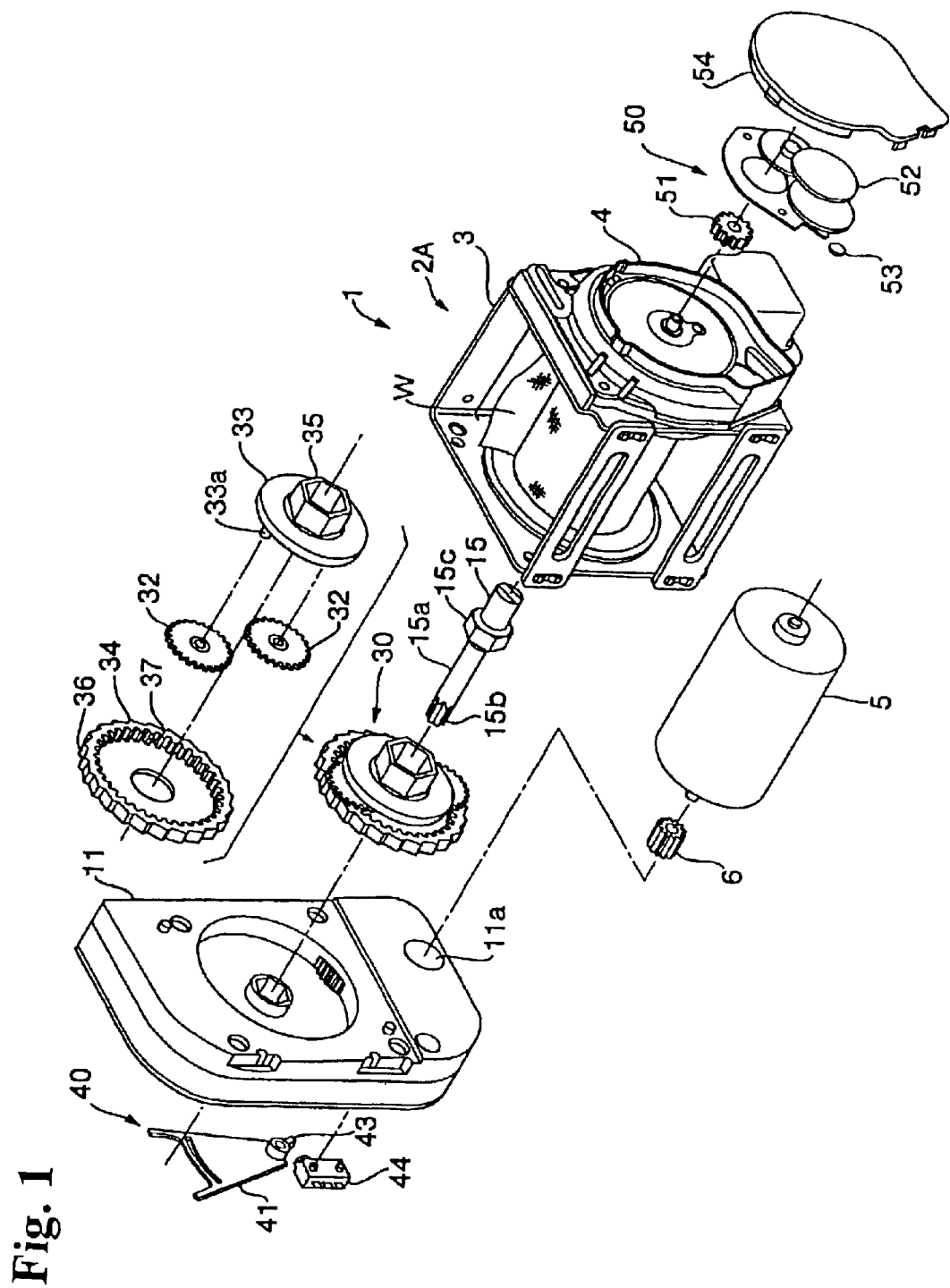
FIG. 1 is an exploded perspective view showing components of a seat belt retractor according to an embodiment of the present invention.
Figure 2:
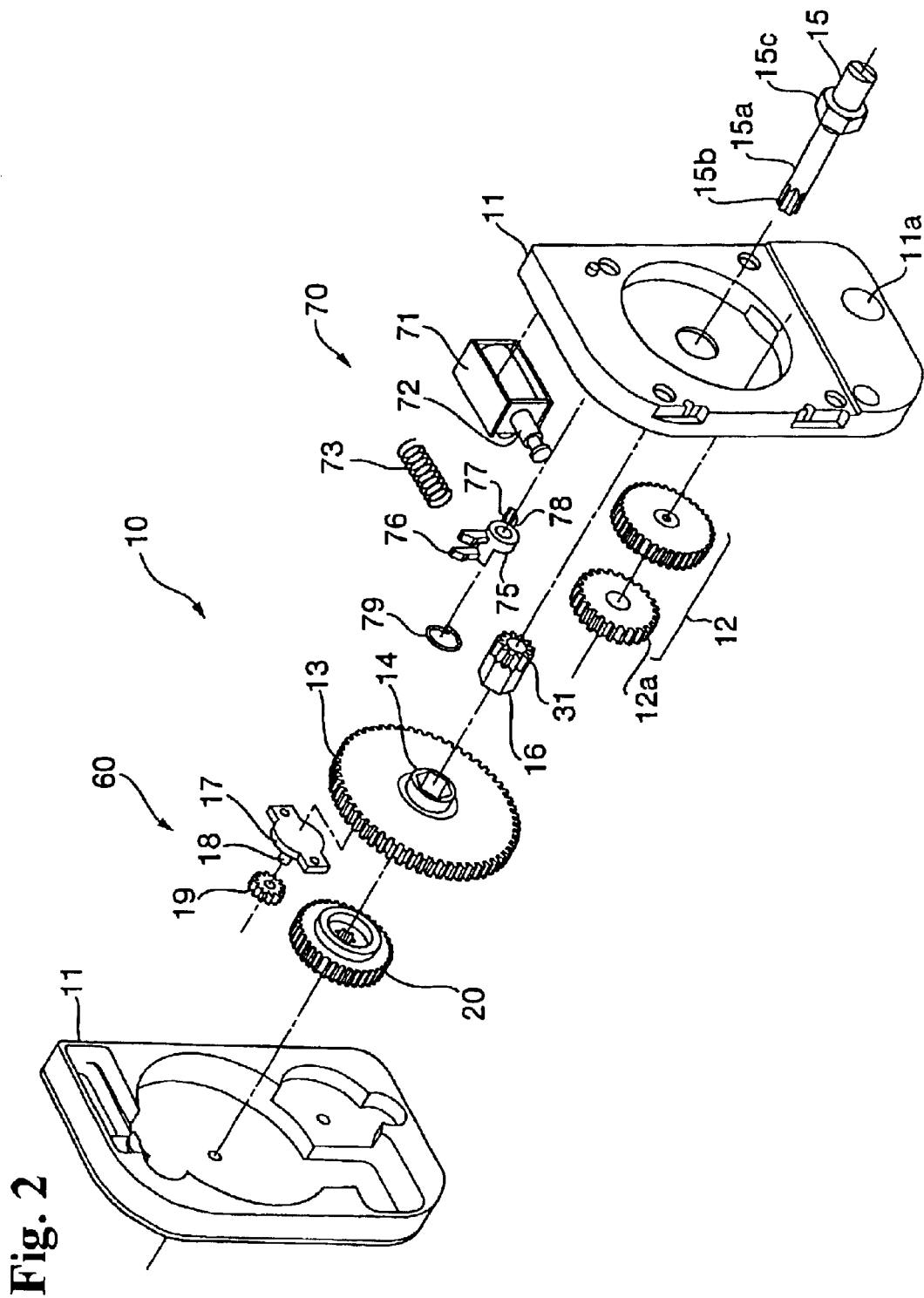
FIG. 2 is an exploded perspective view showing components of a speed-reduction mechanism of the seat belt retractor of the present invention.

FIG. 1 is an exploded perspective view illustrating a schematic structure of an assembly of the seat belt retractor 1 of the present invention including a webbing winding reel 2A; a reel locking mechanism 4; a speed-reduction mechanism casing 11 for accommodating a motor 5 as a driving mechanism and a speed-reduction gear mechanism; a planetary gear unit 30 composing a part of the speed-reduction gear 10 (FIG. 2); and detecting units 40 and 50 for controlling the motor. FIG. 2 is an exploded perspective view showing an internal structure of the speed-reduction mechanism 10 among the components shown in FIG. 1.

In FIG. 1, the webbing winding reel 2A and the reel locking mechanism 4 as the known mechanisms are illustrated in the assembled state. The webbing winding reel 2A comprises a spool 2 on which a webbing W is wound and a base frame 3 rotatably supporting a spool shaft 15 of the spool 2, and the reel locking mechanism 4 (only its outer profile is shown) for preventing the rotation of the spool 2 is integrally attached to the base frame 3. In this embodiment, a single variable speed DC motor 5 is employed as its driving mechanism. A control unit 9 (see FIG. 7) is provided with a circuit device (not shown) in order to control the rotational speed of the DC motor 5. As a driving mechanism to which a rotational torque is transmitted from the DC motor 5, the speed-reduction mechanism 10 is arranged in the speed-reduction mechanism casing 11.

The speed-reduction mechanism 10 includes a first reduction gear mechanism or train 10A and a second reduction gear mechanism or train 10B so as to have two trains. The operation of rotating the spool 2 is achieved through one train by one of the speed-reduction gear mechanisms. At this point, to prevent rotational torque transmitted from one driving machine, such as motor, from being transmitted directly to the two trains, a slip mechanism (hereinafter, designated by numeral 60) as resistant torque means 60 is arranged between gears to slip rotation by a predetermined resistant torque to shut off the transmission of the rotational torque through one of the trains. The arrangement of the slip mechanism 60 allows the speed-reduction gear to be switched to have different reduction by switching means 70.

As shown in FIG. 1, the base frame 3 is a steel product having a channel-like configuration and includes right and left side walls 3a (not shown) which are provided with supporting holes 3b (not shown) into which end flanges of the spool 2 are loosely fitted. Formed on an inner periphery 3c of one of the supporting holes 3b are teeth (not shown) to which a pawl (not shown) is moved by the locking operation of the reel locking mechanism 4 well known so as to engage one of them. This engagement prevents the rotation of the spool 2 when the webbing W is rapidly withdrawn from the retractor 1 so as to prevent the withdrawn of the webbing. Fixed to the other side wall 3a of the base frame 3 is the speed-reduction mechanism casing 11 for housing the assembly of the speed-reduction mechanism 10 for increasing the rotational torque of the motor 5. The speed-reduction mechanism casing 11 is fixed to the side wall 3a through the planetary gear unit 30.

Attached to the outer end of the speed-reduction mechanism casing 11 and the outer end of the reel locking mechanism 4 are a webbing withdrawal detecting unit 40 and a spool rotation detecting unit 50, respectively. A motor gear 6 is arranged in a lower portion of the speed-reduction mechanism casing 11 so as to transmit a predetermined rotational torque to the assembly of the speed-reduction mechanism 10 (its structure will be described later). It should be noted that a casing for housing the motor 5 is not illustrated for simplifying the drawing.

The structure of the speed-reduction mechanism will be described with reference to FIG. 2 through FIG. 4.

As described above, the speed-reduction mechanism 10 comprises the first reduction gear mechanism 10A and the second reduction gear mechanism 10B to compose two trains, which commonly utilize parts of the transmission elements. In this embodiment, a pawl mechanism driven by an electric solenoid 71 is employed as the switching means 70 for switching the operation of the reduction gear mechanisms.

The components of the first reduction gear mechanism 10A will be described with reference to FIG. 2 through FIG. 4. FIG. 3 is a sectional view showing the inside of the seat belt retractor 1 illustrating end faces of the components (gear) in detail for explaining the engaged state of the transmission elements of the speed-reduction mechanism 10, and FIG. 4 is a sectional view showing the inside of the seat belt retractor 1 illustrating sections of the components (gears) in detail for explaining the supporting state of the transmission elements of the reduction gear mechanism 10.

Figure 3:
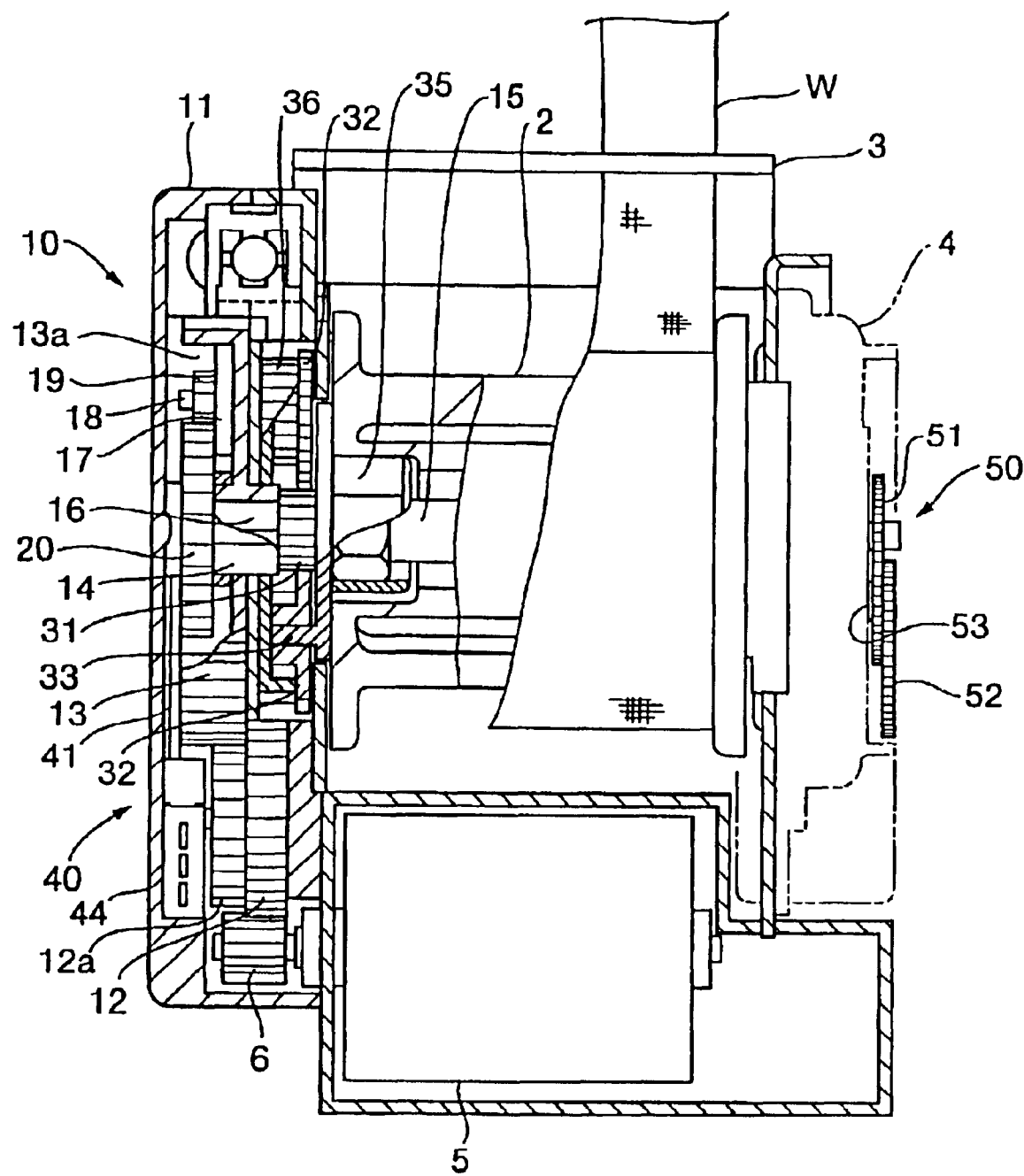
FIG. 3 is a cross-sectional view showing end faces of transmission elements inside the speed-reduction mechanism.
Figure 4:
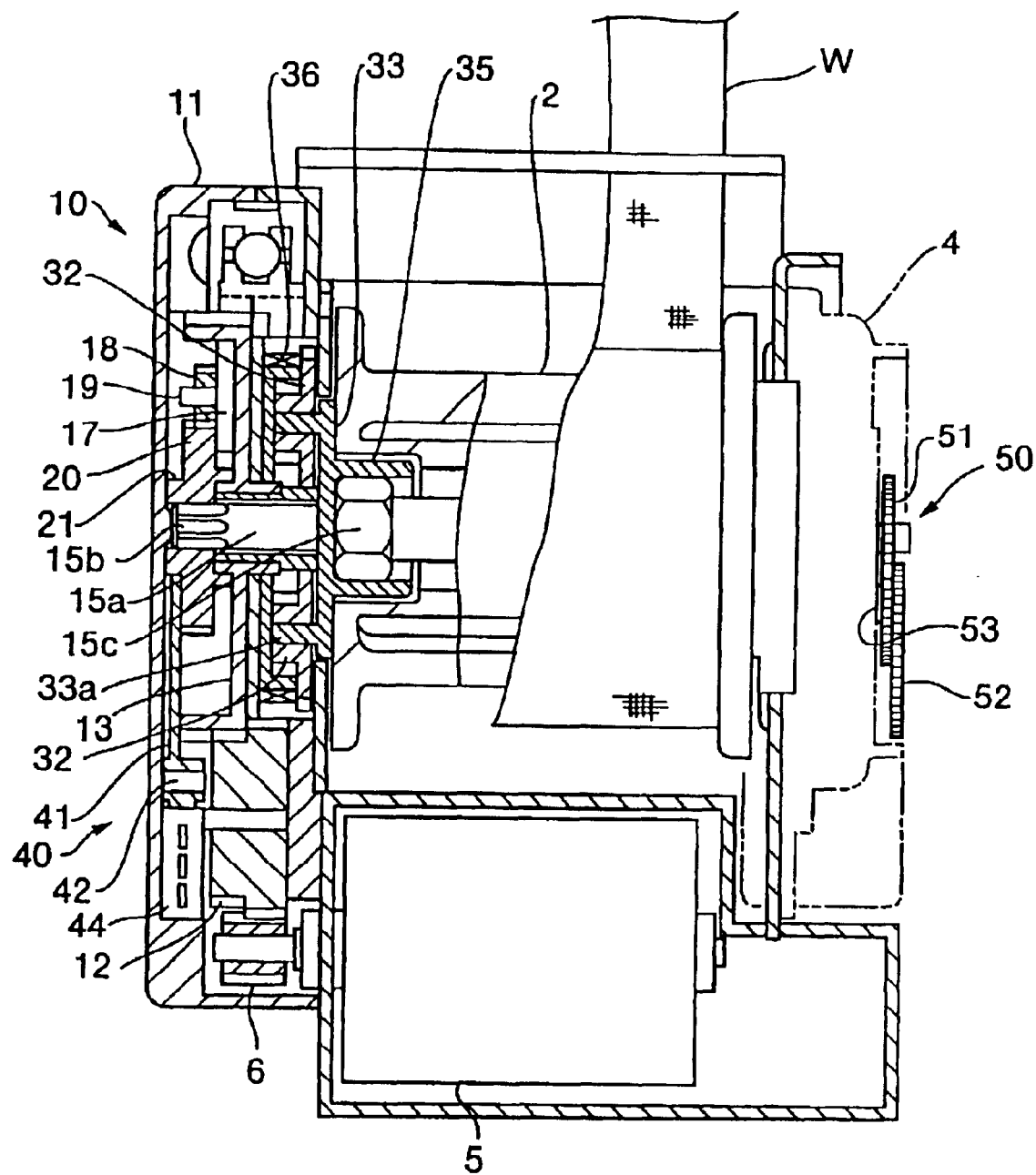
FIG. 4 is a cross-sectional view showing sections of transmission elements inside the speed-reduction mechanism.

As shown in FIG. 1 and FIG. 3, the motor 5 is securely fixed to a lower end of the base flame after the motor gear 6 is inserted through a lower hole 11a formed in the speed-reduction mechanism casing 11. The motor gear 6 is engaged with a double gear 12 supported by a rotational shaft (not shown) inside the casing 11. Though the double gear 12 is composed of two separate gears in FIG. 2, the double gear 12 may be formed integrally. A small gear 12a of the double gear 12 is engaged with a reduction gear 13. The reduction gear 13 has a shaft boss 14, which is fitted over a hexagonal bush 16 coaxially integrally formed on a sun gear 31 (the planetary gear unit 30 will be explained later). The sun gear 31 is loosely fitted over a projection 15a of the spool shaft 15 so that the reduction gear 13 is journalled by the projection 15a. Formed in the entire side outer surface of the reduction gear 13 is a flat recess 13a. A rotary damper 17 well known in the art is fixed to a side surface of the recess 13a. A gear 19 is journalled by a rotor shaft 18 of the rotary damper 17. Oil is sealed within the rotary damper 17. A constant resistant torque is applied to the rotor shaft 18 by a structure that a rotor vane (not shown) turns in the oil to develop viscosity resistance. Further, housed in the recess 13a is a spool driving gear 20, which is fixed to a hexagonal spline 15b formed at the end of the projection 15a. The rotation of the spool driving gear 20 provides a predetermined rotational torque to the shaft end of the spool shaft 15.

The structure of the planetary gear unit 30 arranged coaxially with the spool shaft 15 will now be described with reference to FIGS. 1, 3 and 4.

As clearly shown in the exploded perspective view of FIG. 1, the planetary gear unit 30 comprises two planetary gears 32 which engage the sun gear 31 rotating at the same speed as the reduction gear 13, a carrier 33 which journals the planetary gears 32 and is rotatable coaxially with the sun gear 31, and an internal gear 34 having internal teeth 37 with which the planetary gears 32 contact and engage. Among these components, the carrier 33 has a hexagonal socket 35 on the back surface thereof. The socket 35 is fitted over a hexagonal large-diameter portion 15c when the spool shaft 15 is inserted for assembly. Formed on the entire outer periphery of the internal gear 34 are ratchet teeth 36. The pawl mechanism 70 is engaged with one of the ratchet teeth 36, which will be described later. The engagement between the ratchet teeth 36 and the pawl mechanism 70 fixes the internal teeth 34, so that the rotation inputted from the sun gear 31 is transmitted to the carrier 33 with the revolution of the planetary gears 32 so as to rotate the large-diameter portion 15c of the spool shaft 15 via the socket 35 at a large speed reducing ratio.

Figure 5:
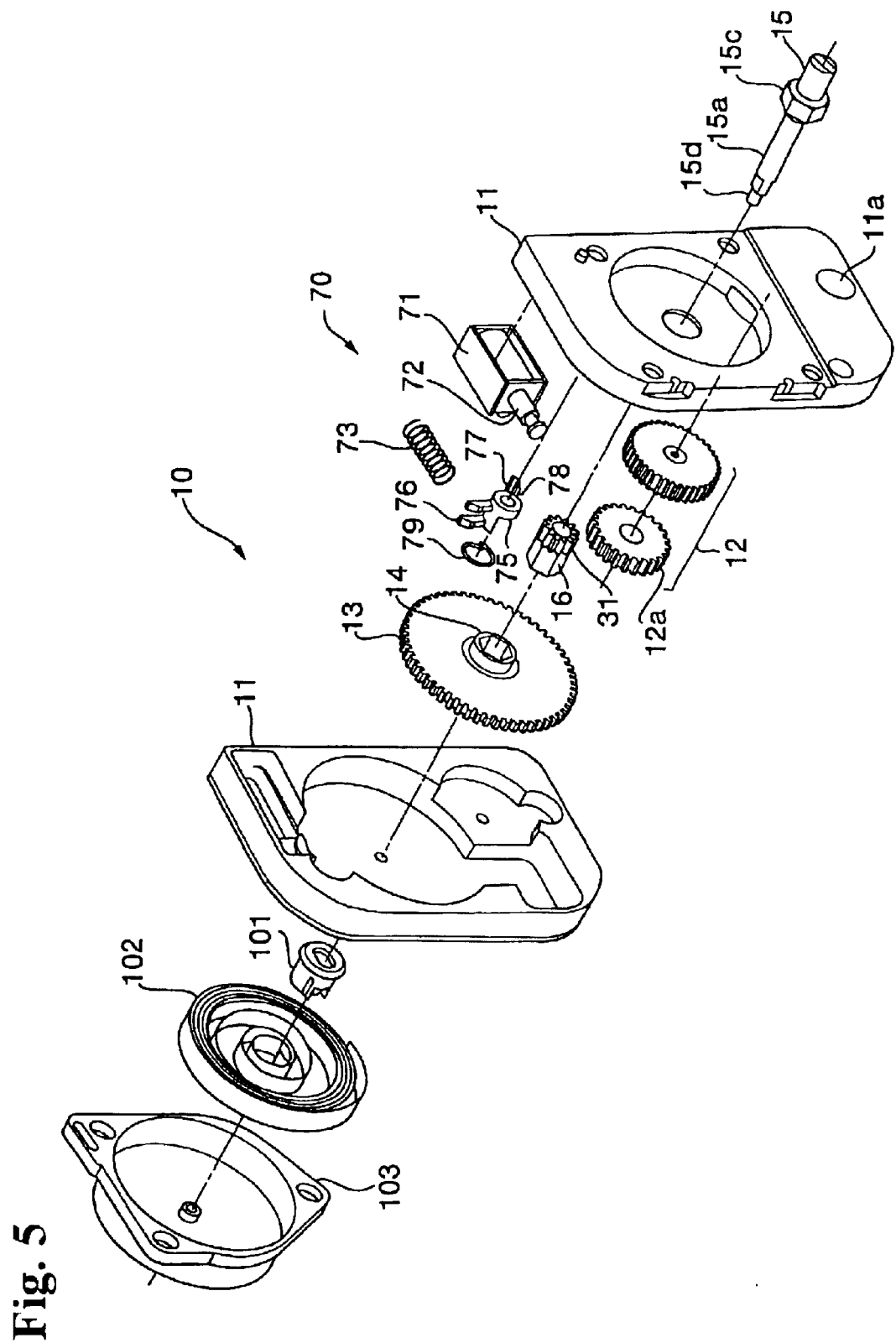
FIG. 5 is an exploded perspective view showing a variation of a retracting mechanism of the seat belt retractor.

With reference to FIG. 5, description will now be made as regard to a variation in which a conventional spiral spring as a return spring is incorporated in a retractor. In this variation, comparing with the structure shown in FIG. 2, the return force of the return spring is utilized for rotating the spool shaft in the webbing winding direction in a normal operation. Formed on the end of the projection 15a of the spool shaft 15 is a cotter 15d on which a spring bush 101 is fitted. An inner end 102a of the return spring 102 as the spiral spring is fixed to the spring bush 101, whereby a torque developed by the winding or unwinding of the return spring 102 is transmitted to the spool shaft 15. A spring cover 103 is fixed to the casing 11 by bolts (not shown) to cover the entire return spring 102. In the seat belt retractor structured as mentioned above, the webbing is wound up by the return spring 102 in a normal operation, while the webbing can be wound up by the motor 5 additionally when the retraction of the seat belt is required in running of the vehicle.

Figure 6:
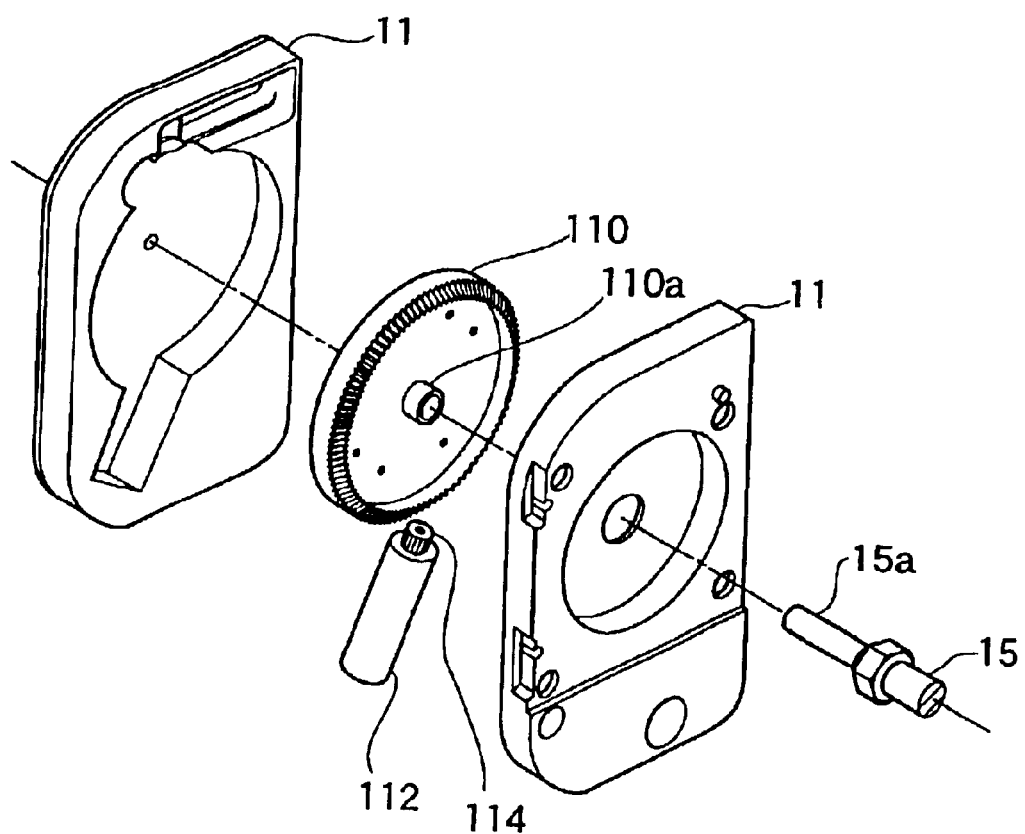
FIG. 6 is an exploded perspective view showing another variation of a retracting mechanism of the seat belt retractor.

FIG. 6 is a partial perspective view showing parts of the structure of a variation of the speed-reduction mechanism, in which the aforementioned function for the large reduction gear ratio is omitted to improve the comfortableness for the occupant wearing the seat belt. As shown in FIG. 6, the projection 15a of the spool shaft 15 extends through a boss 110a of a contrate gear 110 for a large reducing ratio housed in the casing 11 and fixed to the inner end of the return spring (see FIG. 5). The contrate gear 110 is a large gear on which cone-shaped teeth are formed at a constant pitch. On the other hand, an electric motor 112 is housed in the casing 11 in such a manner that the rotational shaft of the motor 112 and the spool shaft 15 cooperate to form a skew gear to have a right angle or a predetermined inclination angle. The electric motor 112 is provided at its shaft end with a driving gear 114, which engages the contrate gear 110. The rotation of the electric motor 112 is transmitted to the contrate gear 110 with reducing its speed so as to achieve the low speed rotation of the spool shaft 15. The electric motor 112 is activated when the occupant wears the seat belt, whereby the excess amount of the webbing (not shown) is withdrawn to such an extent not to provide overpressure to the chest of the occupant so that the webbing lightly fits the body of occupant. The winding of the webbing is performed by the aforementioned return spring while the vehicle is running. Thus, the omission of the function for the large reduction gear ratio enables to manufacture a compact retractor at a low cost.

Figure 7:
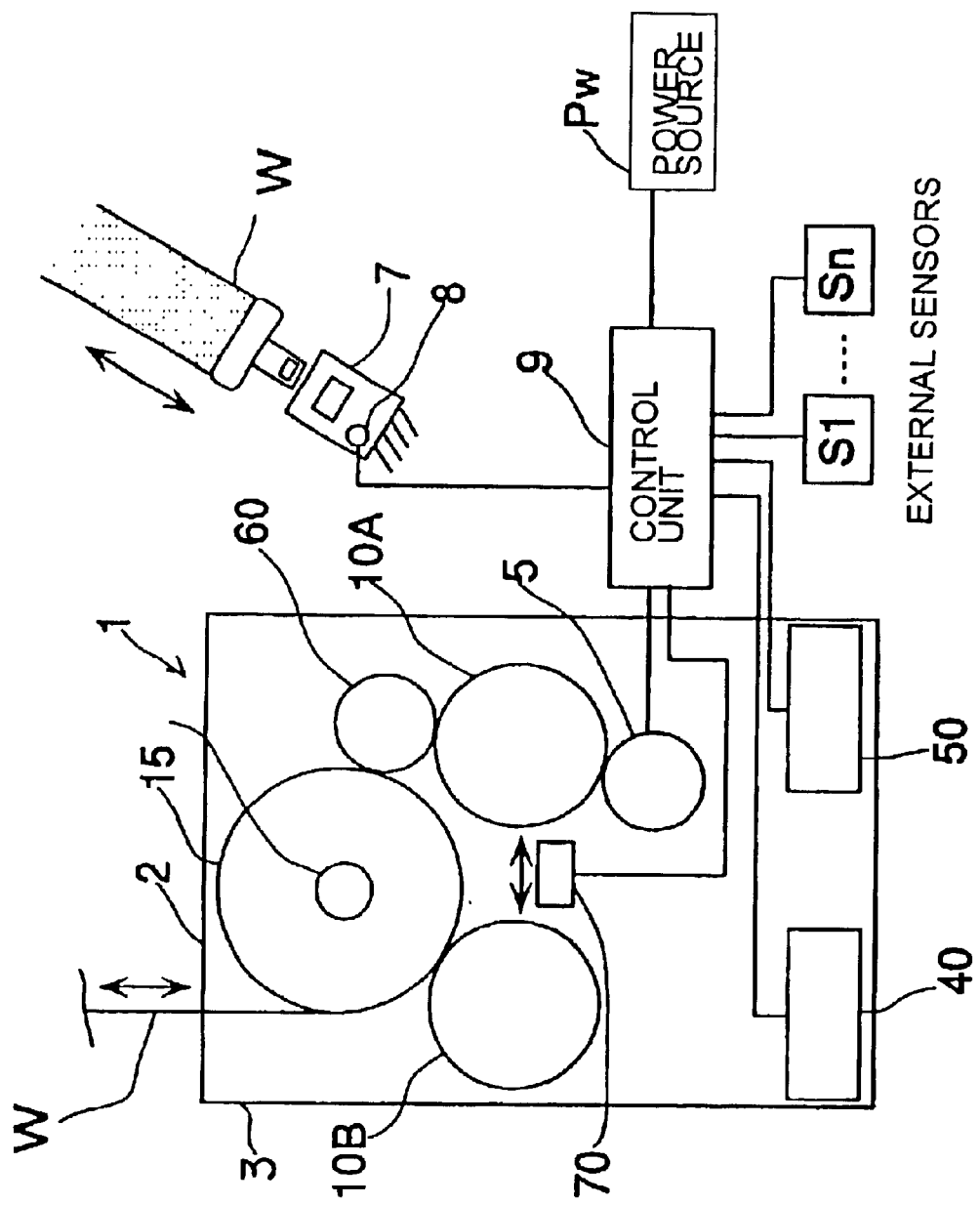
FIG. 7 is an explanatory view schematically showing components for controlling mechanisms and units composing the seat belt retractor according to the present invention.

FIG. 7 shows a schematic structure of the seat belt retractor mentioned above including the respective mechanisms, the control unit for operating these mechanisms to link with each other, and the respective detecting units and detecting sensors for sending operational signals required by the control unit.

Schematically shown in FIG. 7 are the retractor 1 mentioned above, the control unit 9 disposed separately from the retractor 1 for performing a predetermined command operation to the respective mechanisms housed in the retractor 1 as shown in FIG. 1 through FIG. 4, and external signal sensors for informing the state of the occupant wearing the seat belt and the state of the vehicle with regard to the safety.

That is, the spool 2 journalled through the spool shaft 15 to the base frame 3 is disposed in the retractor 1 so that the webbing W is wound onto the spool 2. The retracting operation of the spool 2 is achieved by the first reduction gear mechanism 10A and the second reduction gear mechanism 10B as two trains of different reduction gear ratios for transmitting the rotational torque of the motor 5, the switching means 70 for switching between the two trains according to a signal from the control unit 9, the resistant torque means 60 disposed to effect one of the trains through the first reduction gear mechanism 10A and the second reduction gear mechanism 10B according to the magnitude of the rotational torque to be transmitted, the webbing withdrawal detecting unit 40 for detecting the activation of the motor or the rotation of the spool 2 due to the withdrawal of the webbing W, and the spool rotation detecting unit 50. The control unit 9 is disposed to a portion of the vehicle to output an operational signal to the motor 5 of the retractor 1. Connected to the control unit 9 through inputs I/F (not shown) are the webbing withdrawal detecting unit 40, the spool rotation detecting unit 50, a buckle switch 8 built in a buckle 7 to inform that a tongue connected to the webbing engages the buckle, and a plurality of external signal sensors S1 . . . Sn for informing various states of the vehicle during running of the vehicle. Therefore, various signals indicating various states of the occupant with the seat belt and various signals indicating various running states of the vehicle are inputted into the control unit 9. Based on the input signals, the control unit 9 controls ON/OFF of power sources for the CPU and the motor, and/or generates operational signals, such as control signals for the rotation of the motor and switching signals for switching the speed-reduction mechanism, to control the operation of the motor by the operational signals.

Description will now be made as regard to the structures of the webbing withdrawal detecting unit 40 and the spool rotation detecting unit 50 with reference to FIG. 8. For explaining the detecting units, FIG. 8 schematically shows two sides of the seat belt retractor 1 where the respective detecting units are attached, in a state that the two sides are arranged side by side.

Figure 8:
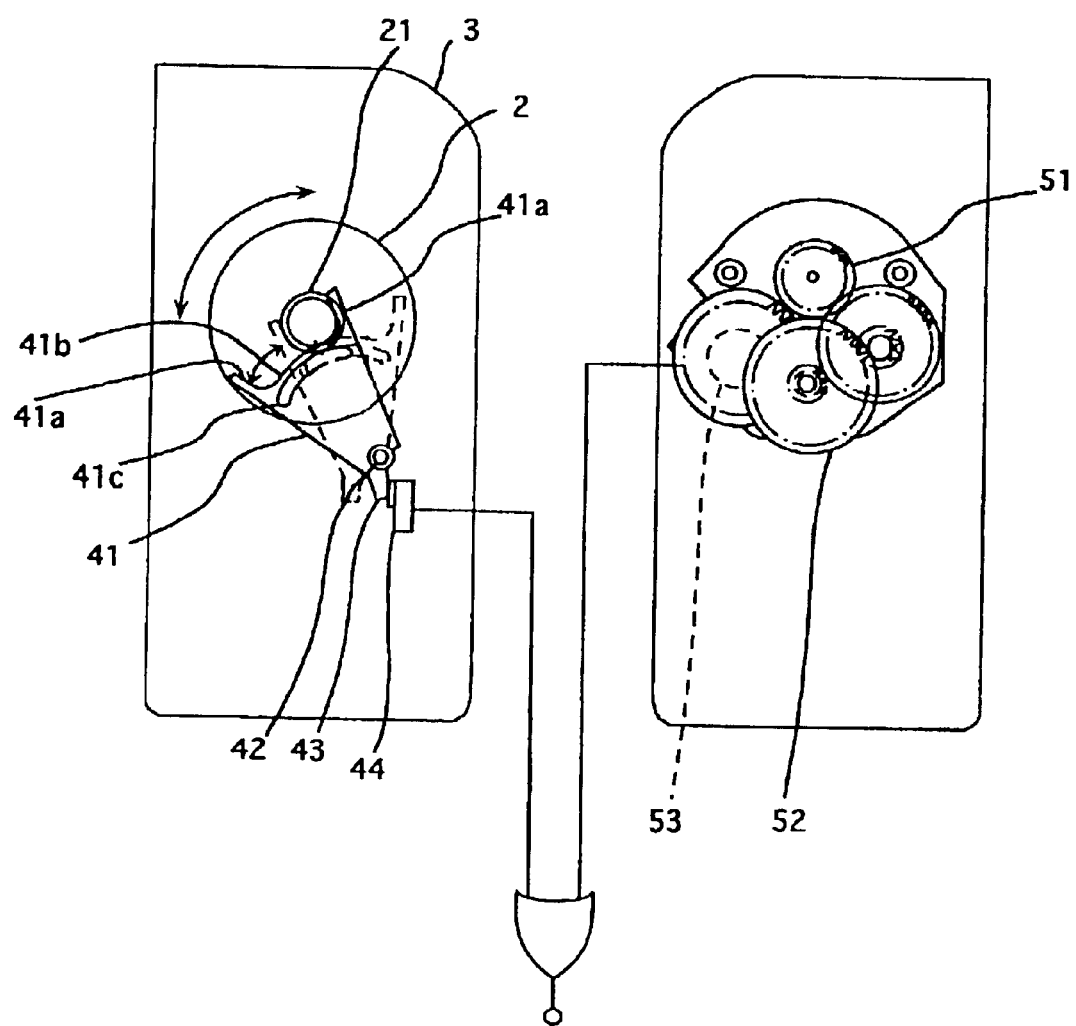
FIG. 8 is an end view showing the structure of a webbing withdrawal detecting unit and a spool rotation detecting unit.

As shown in the left half of FIG. 8, the webbing withdrawal detecting unit 40 comprises a switch plate 41 of a fan shape, a pivot pin 42 for journalling the switch plate 41 as a hinge, a contact arm 43 extending from the pivot pin 42 for a short length, and a limit switch 44 to be turned ON/OFF by the pivotal movement of the contact arm 43. The switch plate 41 is provided with guides 41a on both ends thereof to limit the pivotal range (angle) of the switch plate 41. Within this range, an arc peripheral edge 41b contacts a ring-like portion 21 of the spool driving gear 20. The switch plate 41 is provided with an arc groove 41c inside and along the arc peripheral edge 41b, so that the peripheral edge 41b is slightly deformed so as to apply pressure when the peripheral edge 41b is in contact with the ring-like portion 21. Therefore, the switch plate 41 can pivot according to the rotation of the ring-like portion 21 without slippage. In FIG. 8, the switch plate 41 (shown by two-dot chain lines) pivots in the counter clockwise direction according to the rotation of the spool 2 in the clockwise direction (corresponding to the withdrawal of the webbing W), with the result that the limit switch 44 is turned ON.

Description will now be made as regard to the operation while the limit switch 44 of the webbing withdrawal detecting unit 40 is turned ON. In the normal state, in case that the motor is activated by the operation of the CPU just like this retractor, the ON operation of an ignition key of the vehicle may be a trigger for the power source Pw for the CPU. However, it is most effective that the power source Pw is turn ON by the operation of withdrawal of the webbing. This also allows to make the apparatus compact. The time for tuning ON the power source Pw for the CPU when the webbing is withdrawn is detected by the webbing withdrawal detecting unit 40.

The spool rotation detecting unit 50 is disposed outside the reel locking mechanism 4. The spool rotation detecting unit 50 detects the rotational direction of the spool 2, i.e. the direction of withdrawing or winding of the webbing W, and a stopping state of the spool 2. As shown in FIG. 1 and FIG. 8, the spool rotation detecting unit 50 comprises a gear 51 attached on an end of the spool shaft 15 which rotates coaxially with the spool 2, a train composed of three gears 52 for reducing the rotational speed given through the gear 51, and a variable resistor 53 for detecting a value of resistance indicating the final rotational angle of the gear 51 obtained after the speed reduction. The rotational state of the spool 2 can be detected by detecting the variation in voltage obtained through the variable resistor 53.

The actual operation of the webbing withdrawal detecting unit 40 will be briefly explained. When the occupant stops the winding of the webbing W or withdraws the webbing W while the webbing W is being wound by the operation of the motor 5, the switch plate 41 pivots slightly so as to turn ON the limit switch 44. Therefore, the motor is stopped, so that the occupant can lightly withdraw the webbing W from the retractor 1. As the withdrawal of the webbing W is detected by at least one of the webbing withdrawal detecting unit 40 and the spool rotation detecting unit 50, the motor is stopped. When the withdrawal of the webbing. W is stopped, the motor 5 is turned ON to restart the winding of the webbing W.

As mentioned above, both the webbing withdrawal detecting unit 40 and the spool rotation detecting unit 50 detect the rotation of the spool 2, and the detection functions as the trigger for the circuit. As shown in FIG. 8, for example, the power source Pw for the CPU may be turned ON by an OR circuit for the detecting units.

With regard to the pawl mechanism 70 to be engaged with the ratchet teeth 36 formed on the outer periphery of the internal gear 34 of the planetary gear unit 30, two representative structural examples will be explained and variations will be also explained briefly.

Figure 9A:
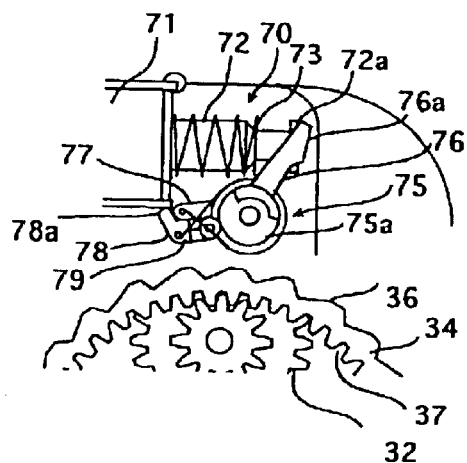
FIGS. 9(a)–9(c) are explanatory views schematically showing the structure and the operation of a first example of a pawl mechanism.

The structure and operation of the pawl mechanism 70 according to a first structural example will now be described with reference to FIG. 2 and FIGS. 9(a) through 9(c). The pawl mechanism 70 comprises a solenoid 71 held by the inner surface of the casing 11 and a pivotal lever stopper 75. As shown in FIG. 9(a), the solenoid 71 has a plunger 72 which slides within the coil thereof by excitation of the solenoid 71. The plunger 72 is retracted in the coil when the solenoid 71 is in the energized state (excited state) and is pulled to its original state by a spring 73 when the excitation of the solenoid 71 is cancelled.

The lever stopper 75 journalled by a pivot shaft is disposed adjacent to the plunger 72. The lever stopper 75 comprises a disk portion 75a coaxial with the pivot, a driving lever 76 and a driven lever 77, which are formed integrally with the disk portion 75a to have a predetermined angle therebetween about the pivot shaft. As illustrated, in the original state, the driving lever 76 is biased by the spring 73 to have a position such that an end 76a of the driving lever 76 extends to the end of the plunger 72. Disposed adjacent to the driven lever 77 is a pawl 78 which can rotate about a pin formed on the disk portion 75. In the original state, the pawl 78 is held to be pushed against the driven lever 77 by a wire spring 79 fitted around the disk portion 75. The pawl 78 is provided with a releasing projection 78a formed at the end thereof.

Figure 9B:
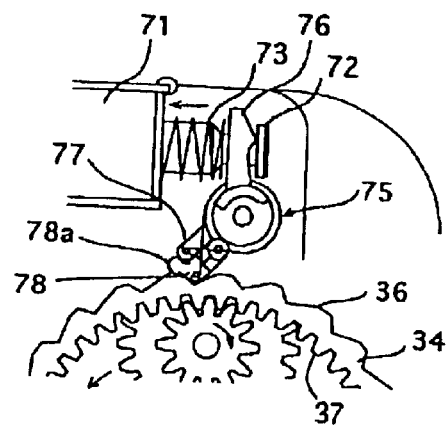
Figure 9C:
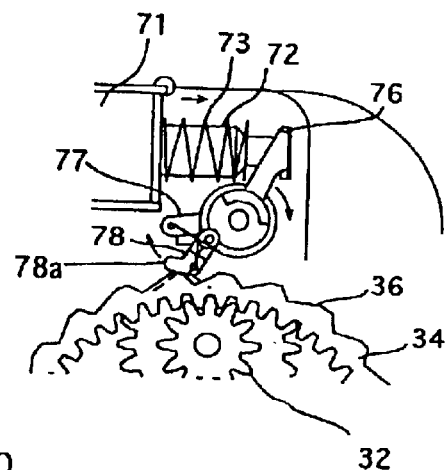

With reference to FIGS. 9(b) and 9(c), description will now be made as regard to the operation of the pawl mechanism 70 for engaging the pawl with the ratchet teeth 36 of the internal gear 34 and for cancelling the engagement.

There are various modes for winding the webbing W. These modes include a mode in which the webbing W is rapidly wound up with a large torque. The operation of rapidly winding up the webbing W is achieved by transmitting the rotational torque of the motor 5 through the second reduction gear mechanism 10B to the spool 2 by the reduced rotation of the carrier 33 for the planetary gears 32. Therefore, as mentioned above, it is required to engage the pawl of the pawl mechanism 70 with the ratchet teeth 36 formed on the outer periphery of the internal gear 34 so as to lock the rotation of the internal gear 34.

FIG. 9(b) shows the state that the solenoid 71 is excited so that the plunger 72 is retracted in the coil of the solenoid 71. With the retraction of the plunger 72, the driving lever 76 of the lever stopper 75 is pushed by the end 72a of the plunger 72 to pivot in the counter clockwise direction. Accordingly, a portion of the pawl 78 projecting from the disk portion 75a and arranged integrally with the driven lever 77 is engaged with one valley of the ratchet teeth 36, thereby locking the rotation of the internal gear 34 in the clockwise direction. As a result of this, the planetary gears 32 engaging the internal teeth 37 of the internal gear 34 revolves in the clockwise direction with a self rotation in the counter clockwise direction. The revolution of the planetary gears 32 makes the carrier 33 to rotate the spool 2 about the spool shaft 15 at a large reduction gear ratio.

The operation of the lever stopper 75 for cancelling the locking of the internal gear 34 will now be described.

As the excitation of the solenoid 71 is cancelled from the state that the rotation of the internal gear 34 is locked, the plunger 72 extends to project from the coil so that the driving lever 76 of the lever stopper 75 pivots in the clockwise direction. At the same time, the driven lever 77 also pivots. Since the pawl 78 is in contact with one of the ratchet teeth 36 with a predetermined pressure at this point, the engagement between the pawl 78 and one of the ratchet teeth 36 is still held even when the driven lever 77 pivots. As the disk portion 75a further rotates, the pawl 78 pivots toward the driven lever 77 to pass over the top of one tooth of the ratchet teeth 36 about the root of the projection 78a as its support by means of the return force of the wire spring 79. Therefore, the engagement between the pawl 78 and the ratchet teeth 36 is cancelled.

Figure 10:
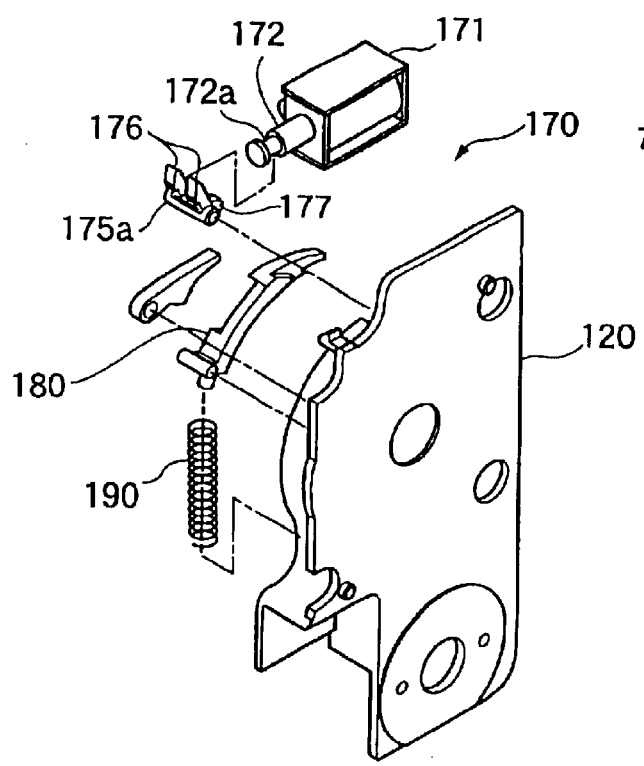
FIG. 10 is partially exploded perspective view showing a second embodiment of a structure of a pawl mechanism.
Figure 11A:
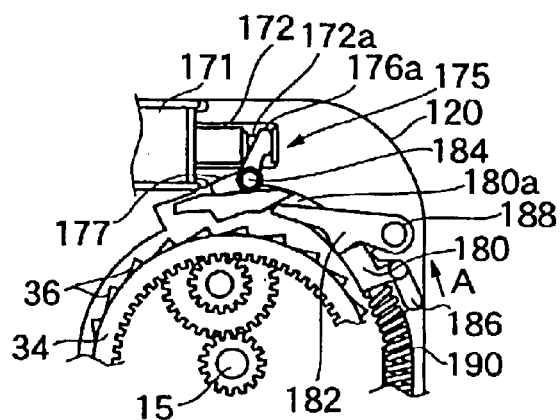
FIGS. 11(a)–11(d) are explanatory views schematically showing the structure and operation of the pawl mechanism shown in FIG. 10.

The structure and operation of a pawl mechanism 170 according to a second structural example will now be described with reference to FIG. 10 and FIGS. 11(a) through 11(d). As shown in FIG. 10 and FIG. 11(a), the pawl mechanism 170 comprises a solenoid 171 held by the inner surface of a retainer plate 120, a lever 175 which operates according to the expansion of a plunger 172 of the solenoid 171, a first pawl 180 to be engaged at its tip with one of the ratchet teeth 36 by the operation of the lever 175, and a second pawl 182 to be engaged at its tip with one of the ratchet teeth 36 according to the pivotal movement of the first pawl 180.

The solenoid 171 has the plunger 172 which slides within the coil when the solenoid 171 is excited. The plunger 172 is retracted in the coil when the solenoid 171 is in the energized state (excited state) and is extended to its original state by a releasing spring 190 and the operation of the second pawl when the excitation of the solenoid 171 is cancelled.

The lever 175 journalled by a pivot shaft 184 is disposed adjacent to the tip of the plunger 172. The lever 175 comprises a support 175a coaxial with the pivot shaft 184, a driving lever 176 and a driven lever 177, which are formed integrally with the support 175a to have a predetermined angle therebetween. As illustrated, the driving lever 176 has a forked tip 176a engaging a small-diameter portion 172a of the plunger 172, so that the driving lever 176 pivots according to the reciprocation of the plunger 172, with the result that the lever 175 turns entirely about the pivot shaft 184.

The first pawl 180 is positioned below the driven lever 177 in such a manner that the first pawl 180 is movable along an elongated hole 186 by a biasing force of the releasing spring 190. The first pawl 180 is substantially formed in an arc shape and is biased in a direction of an arrow A along the elongated hole 186 by the releasing spring 190 connected to the rear end of the first pawl 180. The first pawl 180 is provided with a notch into which a half at the top of the second pawl 182 journalled by a pivot shaft 188 enters.

Figure 11C:
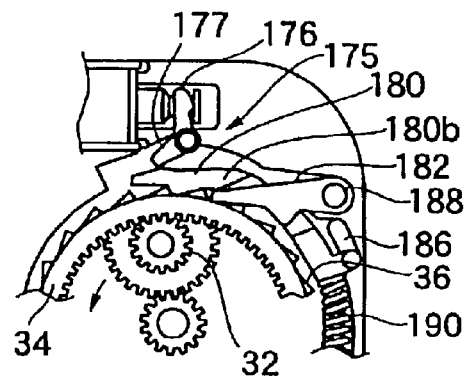
Figure 11B:
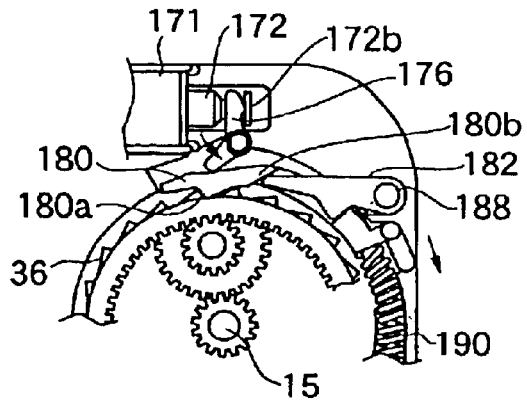
Figure 11D:
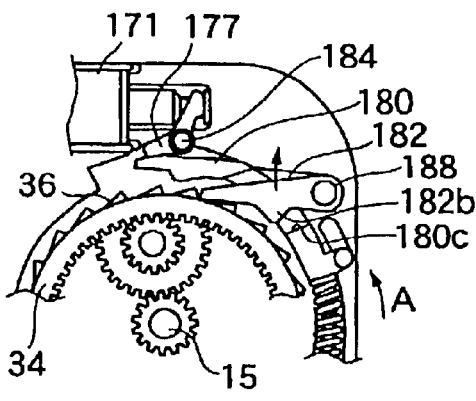

With reference to FIGS. 11(b) through 11(d), description will now be made as regard to the operation of the pawl mechanism 170 for engaging the pawl with the ratchet teeth 36 of the internal gear 34 and for cancelling the engagement.

As in the first structural example, the description will be made by reference to a case that the webbing W is rapidly wound up with a large torque. As described above, the operation of rapidly winding up the webbing W is achieved by transmitting the rotational torque of the motor 5 through the second reduction gear mechanism 10B to the spool 2 by the reduced rotation of the carrier 33 for the planetary gears 32. Therefore, as mentioned above, it is required to engage the pawl of the pawl mechanism 170 with the ratchet teeth 36 formed on the outer periphery of the internal gear 34 so as to lock the rotation of the internal gear 34.

FIG. 11(b) shows the state that the solenoid 171 is excited so that the plunger 172 is retracted in the coil of the solenoid 171. With the retraction of the plunger 172, the driving lever 176 of the lever 175 is pulled by the end 172a of the plunger 172 to pivot in the counter clockwise direction. Accordingly, the driven lever 177 also pivots about the support 175a. At this point, the driven lever 177 moves the first pawl 180 positioned below the driven lever 177 to pivot in the counter clockwise direction against the biasing force of the releasing spring 190, thereby engaging a projection 180a formed on the bottom of the first pawl 180 with one valley of the ratchet teeth 36.

As shown in FIG. 11(c), as the internal gear 34 rotates about the shaft 15 (the spool shaft) in the clockwise direction, the first pawl 180 moves along the elongated hole 186 about the shaft 15 in the clockwise direction in such a manner as to compress the releasing spring 190. Since the upper surface of the first pawl 180 is pressed and restricted by the driven lever 177, the first pawl 180 is prevented from being released. At this point, a portion of the notch 180b of the first pawl 180 presses the end 182a of the second pawl 182 so as to move the second pawl 182 to pivot about the pivot shaft 188 in the counter clockwise direction, thereby locking the rotation of the internal gear 34 in the clockwise direction. As a result of this, the planetary gears 32 engaging the internal teeth 37 of the internal gear 34 revolves in the clockwise direction with a self rotation in the counter clockwise direction. The revolution of the planetary gears 32 rotates the spool 2 about the spool shaft 15 at a large reduction gear ratio.

With reference to FIG. 11(d), the operation of the lever 175, the first pawl 180, and the second pawl 182 for cancelling the locking of the internal gear 34 will now be described.

As the excitation of the solenoid 171 is cancelled from the state that the rotation of the internal gear 34 is locked, the force for holding the plunger 172 within the coil is cancelled, so that the driven lever 177 pivots about the pivot shaft 184 in the clockwise direction because of the biasing force of the releasing spring 190 in its extended direction (direction of arrow A). As a result of this, the force for restricting and engaging the first pawl 180 with one of the ratchet teeth 36 is cancelled, so that the first pawl 180 pivots about the shaft 15 in the counter clockwise direction to bring an end 180c into contact with a projection 182b of the second pawl 182, thereby moving the second pawl 182 to pivot about the pivot shaft 188 in the clockwise direction. In this way, the engagement among the ratchet teeth 36 of the internal gear 34 and the two pawls 180, 182 can be completely cancelled.

According to the second structural example described above, it is not required to rotate the motor in reverse even for cancelling the locking. The engagement between the two pawls and the ratchet teeth can be easily cancelled by the two pawls, which is made by means of the biasing force of the releasing spring.

Hereinafter, variations of the pawl mechanism 70 according to the first structural example will be described in brief.

Figure 12A:
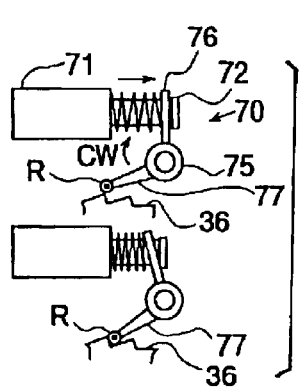
FIGS. 12(a)–12(c) are explanatory views schematically showing variations of a switching mechanism of the speed-reduction mechanism.

FIG. 12(a) shows an example in which the driven lever 77 is directly engaged with the ratchet teeth 36. The pawl mechanism 70 of this example is provided with a roller R disposed on an end of the driven lever 77. The rotation of the roller R reduces friction between one of the ratchet teeth 36 and the end of the lever 77 so as to facilitate releasing of the end of the lever 77 from the ratchet teeth 36 when the plunger 72 extends, and the driving lever 76 and the driven lever 77 rotate together in the clockwise direction.

Figure 12B:
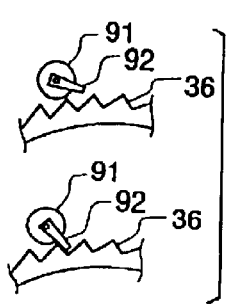
Figure 12C:
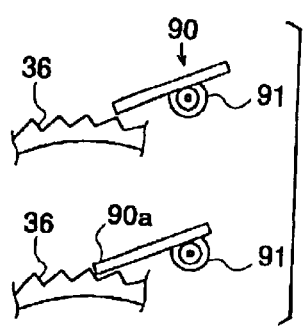

FIG. 12(b) shows an example comprising a geared motor 91 and an arm-like stopper 92 disposed on the output shaft of the geared motor 91 in which the stopper 92 (pawl) is moved to pivot by the operation of the geared motor 91. FIG. 12(c) shows an example comprising a rack and pinion mechanism 90 in which a rack 90a is brought into contact with the ratchet teeth 36 by using a geared motor 91. In cases of FIG. 12(b) and FIG. 12(c), releasing of the stopper (pawl or rack) can be surely achieved because of using the geared motor.

With reference to FIG. 13(a) through FIG. 15, description will now be made as regard to the paths for transmitting the rotational force through the first reduction gear mechanism 10A and the second reduction gear mechanism 10B achieved by the aforementioned mechanisms and to the operation of the slip mechanism.

The rotational speed of the DC motor 5 of this embodiment is controlled by an open loop method according to pulse signals outputted from a driving circuit. In this embodiment, the control circuit is designed to allow the webbing to be wound with a small, middle, or large rotational torque by duty rates of three stages (25%, 50%, 100%). The relation between the actual using condition and the setting mode for winding the webbing will be described later.

First, description will now be made as regard to the operation of the respective elements for the transmission of the rotation of the motor 5 to the spool shaft 15 through the first reduction gear mechanism 10A for winding the webbing with a small torque.

Figure 13A:
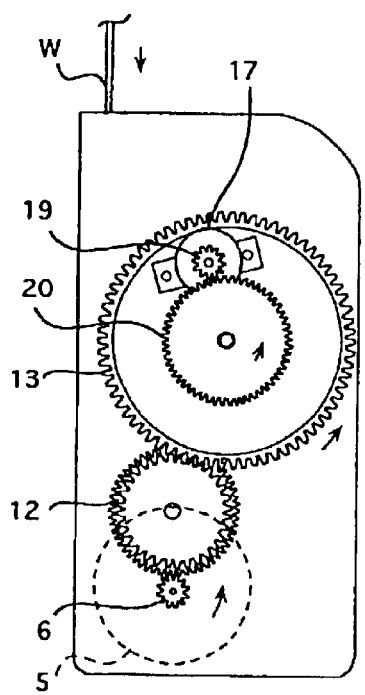
FIGS. 13(a) and 13(b) are explanatory views showing the linkage between a reduction gear mechanism and a slip mechanism.

As shown in FIG. 13(a), as the motor 5 rotates at a low rotational speed in the counter clockwise direction for the purpose of winding up the webbing, the reduction gear 13 rotates at a low rotational speed via the gear 12. Since the rotational torque of the reduction gear 13 at this point is lower than the preset torque for the rotor shaft 18 of the rotary damper 17 disposed in the recess 13a, the spool driving gear 20 does not rotate relative to the reduction gear 13 and thus rotates together with the reduction gear 13. Therefore, the rotational torque of the reduction gear 13 is applied as the rotational force for winding up the spool 2 without increase and decrease. According to the rotation of the spool 2, the carrier 33 of the planetary gear unit 30 integrally attached to the spool 2, the sun gear 31 and the internal gear 34 loosely fitted over the projection 15a of the spool shaft 15 do not rotate relative to each other, but rotate integrally with the spool 2 in the counter clockwise direction (see FIG. 14(a)).

Now, description will be made as regard to tile operation of the respective elements for the transmission of the rotation of the motor 5 to the spool shaft 15 through the second reduction gear mechanism 10B for rapidly winding the webbing W with large torque.

Figure 13B:
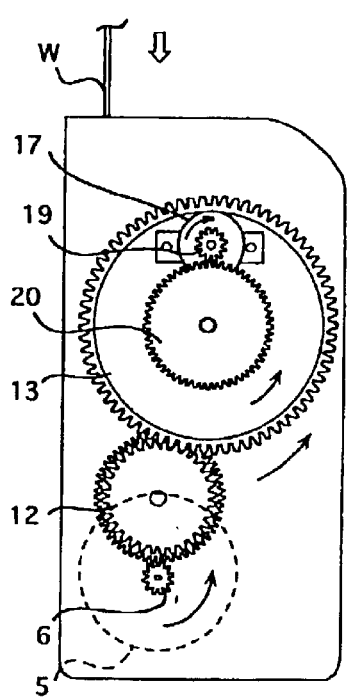

As shown in FIG. 13(b), as the motor 5 rotates at a high rotational speed in the counter clockwise direction for the purpose of winding up the webbing, the reduction gear 13 rotates via the gear 12 at a predetermined reduction gear ratio. The sun gear 31 of the planetary gear unit 30 shown in FIG. 14(b) rotates to make the same revolution as the reduction gear 13. Since the pawl of the pawl mechanism 70 is engaged with the ratchet teeth 36 formed on the outer periphery of the internal gear 34, the rotation of the internal gear 34 is locked. Therefore, the planetary gears 32 revolve with engaging the internal teeth 37 of the locked internal gear 34 according to the self rotation of the sun gear 31, and the carrier 33 journalling the planetary gear 32 thus rotates in the counter clockwise directions. According to the rotation of the carrier 33, a large rotational torque is transmitted to the large-diameter portion of the spool shaft 15 through the socket 35.

Since the rotational torque of the reduction gear 13 at this point exceeds the preset torque of the rotor shaft 18 of the rotary damper 17 provided as the slip mechanism 60, the gear 19 of the rotary damper 17 engaging the spool driving gear 20 rotates for braking with viscosity resistance. Thus, since the input from the reduction gear 13 is shut off by the slip mechanism 60, the rotation of the first reduction gear mechanism 10A is slipped, thereby preventing the train through the first reduction gear mechanism 10A and the train through the second reduction gear mechanism 10B from being connected directly (FIG. 13(b)).

Figure 15:
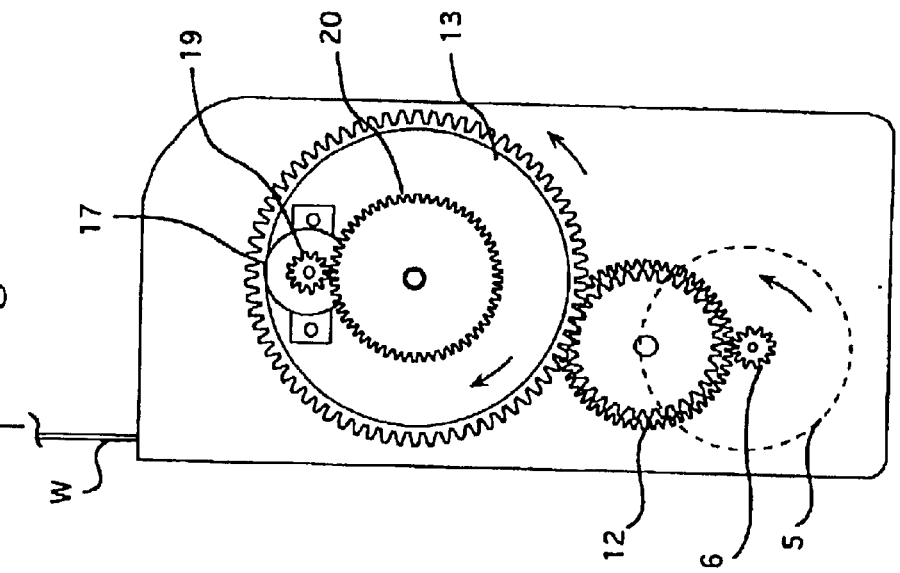
FIG. 15 is an explanatory view showing a state of withdrawal of a webbing while the webbing is wound.
Figure 14B:
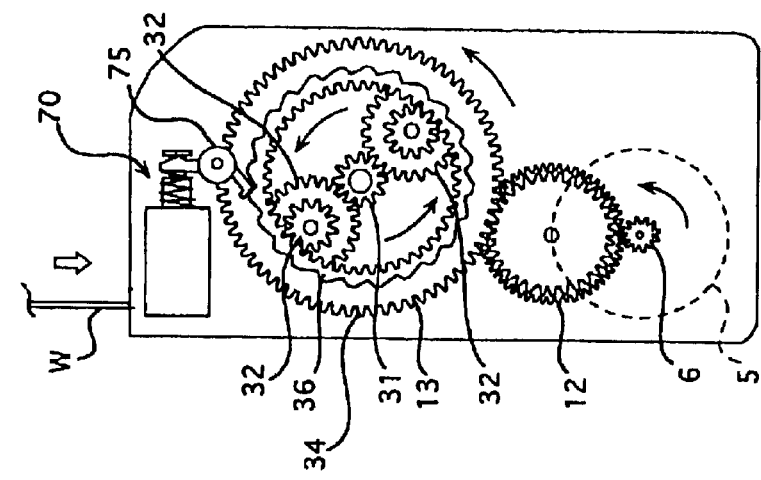
FIGS. 14(a) and 14(b) are explanatory views showing the switching operation in a planetary gear unit.
Figure 14A:
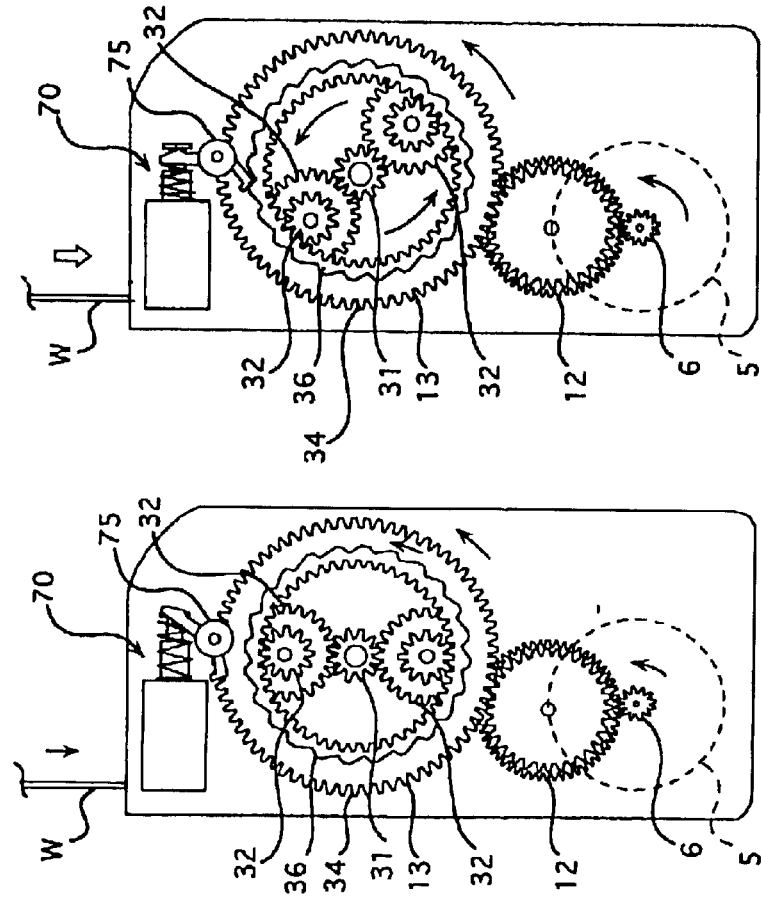

Furthermore, description will now be made as regard to a typical condition for activating the slip mechanism 60 with reference to FIG. 15. As the occupant clasps the webbing W to stop the winding or to withdraw the webbing W while the motor 5 rotates at a low rotational speed, the spool driving gear 20 stops or rotates in the clockwise direction. At this point, the motor 5 rotates in the counter clockwise direction. As the rotation of the reduction gear 13 in the counter clockwise direction is stopped, the load is applied in reverse. At this point, the spool driving gear 20 with torque exceeding the preset torque of the rotor shaft 18 of the rotary damper 17 rotates in a direction opposite to the rotational direction of the motor, thus causing slippage to the gear 19 of the rotor shaft 18. Since the withdrawal of the webbing W is detected by the webbing withdrawal detecting unit 40, the operation of the motor 5 is stopped, thereby allowing the occupant to easily withdraw the webbing W.

Modes in which the motor is driven according to the control method of the seat belt retractor structured as mentioned above will be described with reference to flow charts shown in FIG. 16 through FIG. 18 and diagrams showing changes of state when the webbing is wound shown in FIG. 19 and FIG. 20.

Figure 16:
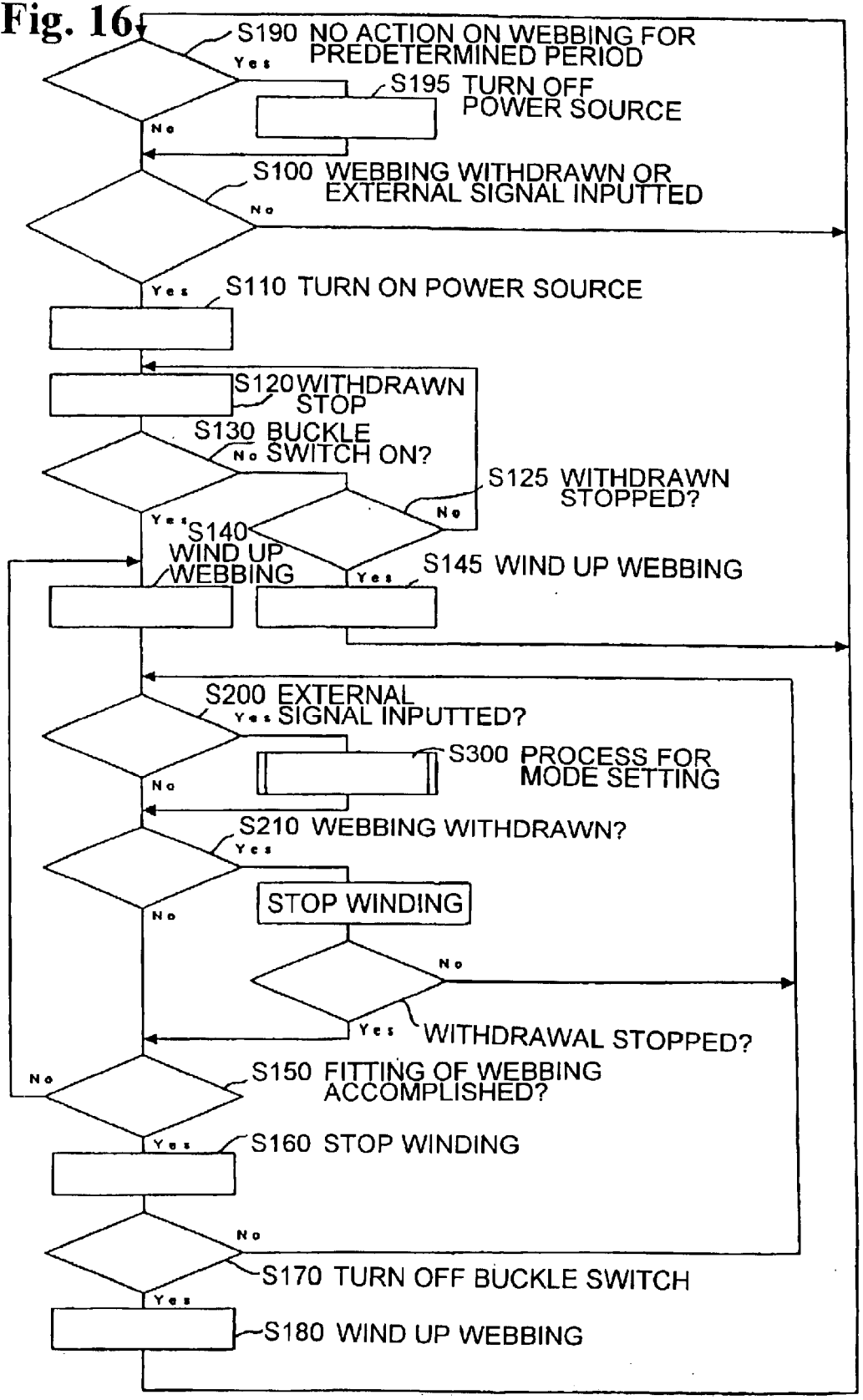
FIG. 16 is a flow chart showing the operational flow for controlling the winding of the webbing.

FIG. 16 is a flow chart showing the operational flow for controlling the winding of the webbing. FIG. 17 is a flow chart showing the processing flow for setting the modes. FIG. 18 is a flow chart showing the operational flow for improving the comfortableness for the occupant wearing the seat belt.

As described above, the speed of the DC motor 5 used in the seat belt retractor 1 can be set in detail by setting a voltage or setting pulse signals in the control circuit. Therefore, the operational mode for winding the webbing can be suitably set to correspond to movement of the occupant wearing the seat belt and various external signals received during movement of the vehicle, thereby achieving the minute winding operation of the seat belt.

The operations in each mode corresponding to the state signal from a point when the occupant wears the seat belt after getting on the vehicle to a point when the occupant takes off the seat belt for getting off the vehicle, and to the external signal obtained during running of the vehicle will be described in connection with the setting of the rotational speed of the motor.

At the same time that the occupant sits on a vehicle seat, the occupant normally pulls out the seat belt and inserts the tongue into the buckle at a side of the seat opposite to the side where the retractor is positioned. At this point, the withdrawal of the webbing W is detected by the webbing withdrawal detecting unit 40 of the retractor 1 so as to turn ON the power source Pw for the circuit and CPU (Step 100, Step 110). The power source Pw may be turned ON according to an external signal by the activation of the ignition key or the like. By the state signal indicating the detection of the webbing withdrawal, the operation of the motor 5 is stopped so as to cancel the winding of the webbing (Step 120, Step 130). After that, when the tongue is correctly engaged with the buckle and thus the buckle switch 8 (see FIG. 7) built in the buckle 7 is turned ON, the motor 5 rotates at a middle speed for winding up the webbing W in order to remove the excess amount of the seat belt to fit the seat belt to the occupant. This allows the webbing W to extend on the chest to the waist of the occupant without overpressure. As a result of this, slack of the webbing can be eliminated, so that the seat belt can be lightly fitted to the occupant's body (Step 150). According to a state signal indicating that the fitting of the webbing is achieved, the torque of the motor may be reduced or the operation of the motor may be stopped to eliminate the feeling of pressure to the occupant. When the occupant moves largely forward from the state mentioned above, the webbing is withdrawn according to this movement. After a point when the withdrawal of the webbing is stopped, the winding of the webbing is restarted in the same manner.

When a state signal indicating that the withdrawal of the webbing W is stopped in a middle thereof is inputted, the webbing W is wound up at a predetermined torque to be housed in the retractor 1 (Step 125, Step 145).

As the occupant bends forward when the tongue is engaged with the buckle, the webbing is further withdrawn. At this point, the operation of the motor 5 is stopped. When the occupant stops bending and returns, a state signal indicating that the withdrawal of the webbing is stopped is inputted. According to the state signal, the motor is activated to restart the winding of the webbing. After the webbing is lightly fitted, the driving torque of the motor may be reduced or the operation of the motor may be stopped.

When the occupant is about to get off the vehicle, the webbing W is required to be wound up slowly after the tongue is disengaged and to be stored into the retractor within a pillar or the like for a predetermined amount. After that, when it is determined that the withdrawal is not performed for a predetermined period, the power source Pw for CPU is turned OFF by the circuit (Step 170 through Step 195).

In this manner, the comfortableness when the occupant puts on the seat belt is improved. To further improve the comfortableness when the occupant wears the seat belt, it is preferable to control the retractor to perform movements as described below. The description will be made with reference to FIG. 18 and FIG. 20.

Conventionally, when the occupant slides the seat backward by means of a seat sliding mechanism or the like after wearing the seat belt, the withdrawal of the seat belt is not detected. To cope with such a situation, the winding of the seat belt is repeatedly performed at predetermined intervals, thereby cancelling the looseness of the seat belt when wearing. Concretely, as shown in FIG. 18, when the withdrawal of the seat belt is detected, the predetermined winding is performed (Step 300, Step 310). When a predetermined time period passes after the winding is completed (Step 320, Step 330), the winding is started again (Step 310) and whether the winding is enough is detected from the webbing state (S340). When the winding is enough, the winding is completed (Step 350). This detecting loop is repeatedly performed at predetermined intervals. In this way, the looseness of the webbing can be completely cancelled while the occupant wears the seat belt.

In the present invention, the webbing can be wound by the motor for fitting the webbing to the occupant. At this point, the pressure on the chest of the occupant can be softened by controlling the speed of the motor. Concretely, the motor is set to have various speeds as shown in FIG. 20. The speed of the motor may be controlled by a known method, such as controlling PWM driving or controlling operational voltage. The speed control can be performed at predetermined intervals (for example, 1 minute). In this speed control, the driving of the motor is stopped to reduce the tension on the seat belt for the purpose of facilitating the withdrawal of the seat belt before the tongue is engaged with the buckle as shown in the variation diagram of FIG. 20. On the other hand, since it is preferable to quickly wind up the webbing immediately after the tongue is engaged with the buckle, the rise in speed of the motor at this point is set to be the same as a conventional one.

During running of the vehicle, the motor is controlled mainly according to pulse signals corresponding to detected external signals. The motor can be set in one of the following modes according to the state of emergency.

Warning Mode

The main object of this mode is to inform an emergent situation to the driver, for example, when a distance detecting sensor detects that the distance from another vehicle in front of or behind the own vehicle is shorter than the preset value. The preset value for the distance from another vehicle can be variously set, for example, according to the vehicle speed. For example, when there is an object within a predetermined distance, the webbing is wound in order to inform the presence of the object and the approaching state to the driver. It should be considered that the motor may be prevented from being set in the warning mode when the vehicle is brought closer to an object intentionally by the driver, such as for moving the vehicle into a garage, by using a speed of the vehicle, a relative speed to the object, a rate of change, and the like as factors.

Holding Mode

The object of this mode is to hold the occupant's body by winding up the webbing, for a more emergent situation than that of the warning mode. For example, when the driver dozes during driving so that the driver bends forward while withdrawing the seat belt and a conventional doze detecting sensor detects the doze of the driver, the winding of the webbing by the motor in this mode functions as an alarm for straightening the driver's posture and waking up the driver. When the vehicle runs on a bad road, a signal for activating the motor in this mode may be outputted to improve the safety by holding the driver and/or occupant to the seat. In this case, as a trigger for outputting an external signal for this mode, an ABS operational signal and signals from a steering angle sensor and a road surface sensor may be employed.

Pretensioning Mode

Conventionally, a seat belt device is equipped with a pretensioner for winding up a predetermined amount of webbing when a vehicle collision or emergency deceleration is detected, thereby improving the effect of restraint of an occupant. When it is determined by a distance detecting sensor, such as a laser radar, that it is impossible to escape from a vehicle collision, the webbing is rapidly wound up by the motor prior to the collision. The speed of winding up the webbing should be set not to harm the occupant due to the rapid winding to prevent the secondary accident.

In Case of Fixing a Child Seat

A child seat is normally fixed to a seat by means of a webbing. As for a conventional child seat, it is required to withdraw the entire length of the webbing to fix the child seat to the vehicle seat for preventing looseness during running of a vehicle. Accordingly, it is desired to provide a dedicated mode to fix the child seat to the vehicle seat. For example, a child seat switch is provided. When the switch is turned ON, the webbing is tightly wound until the child seat is fixed to the vehicle seat with a relatively large torque.

Figure 17:
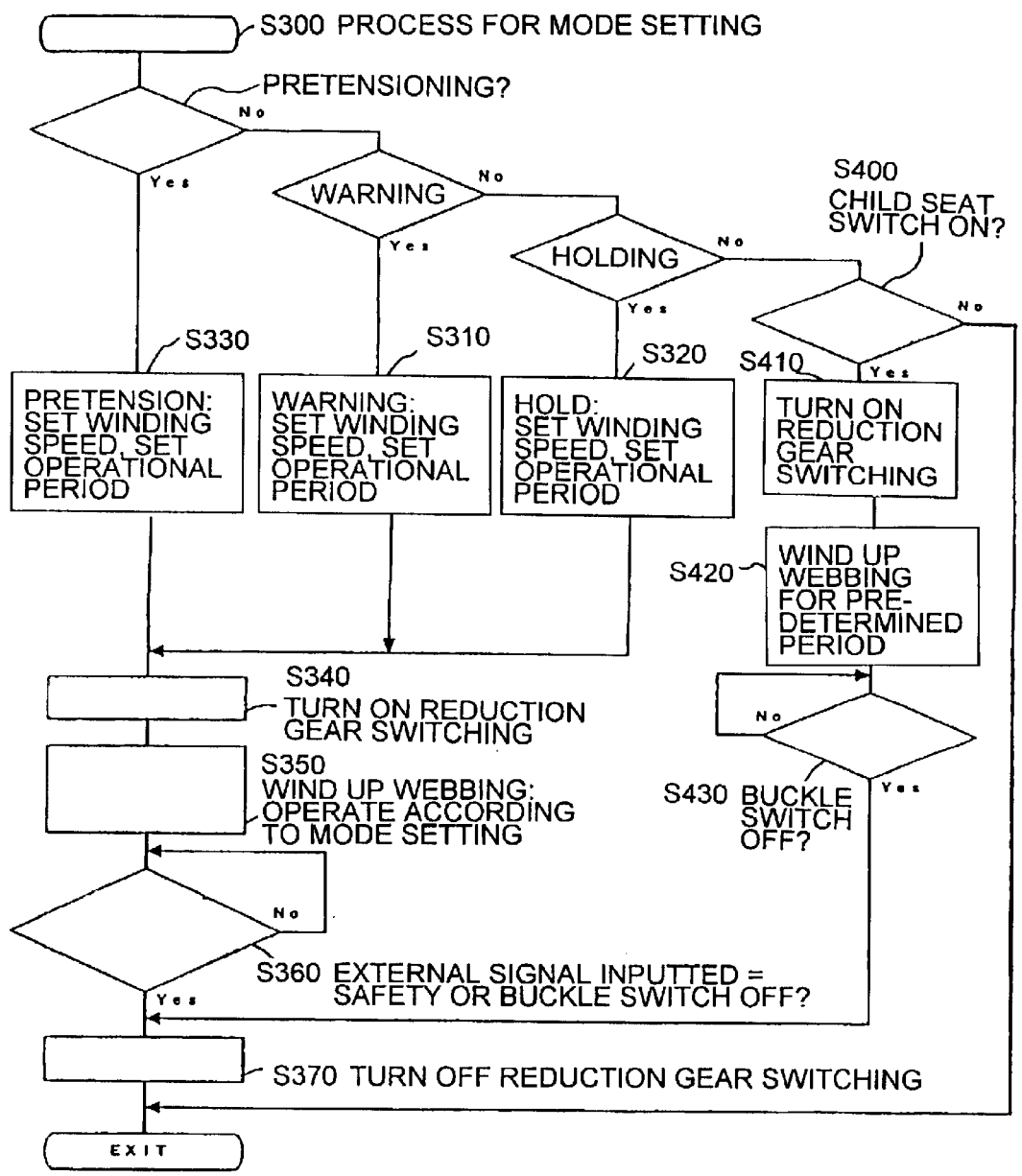
FIG. 17 is a flow chart showing the operational flow for setting each mode.
Figure 18:
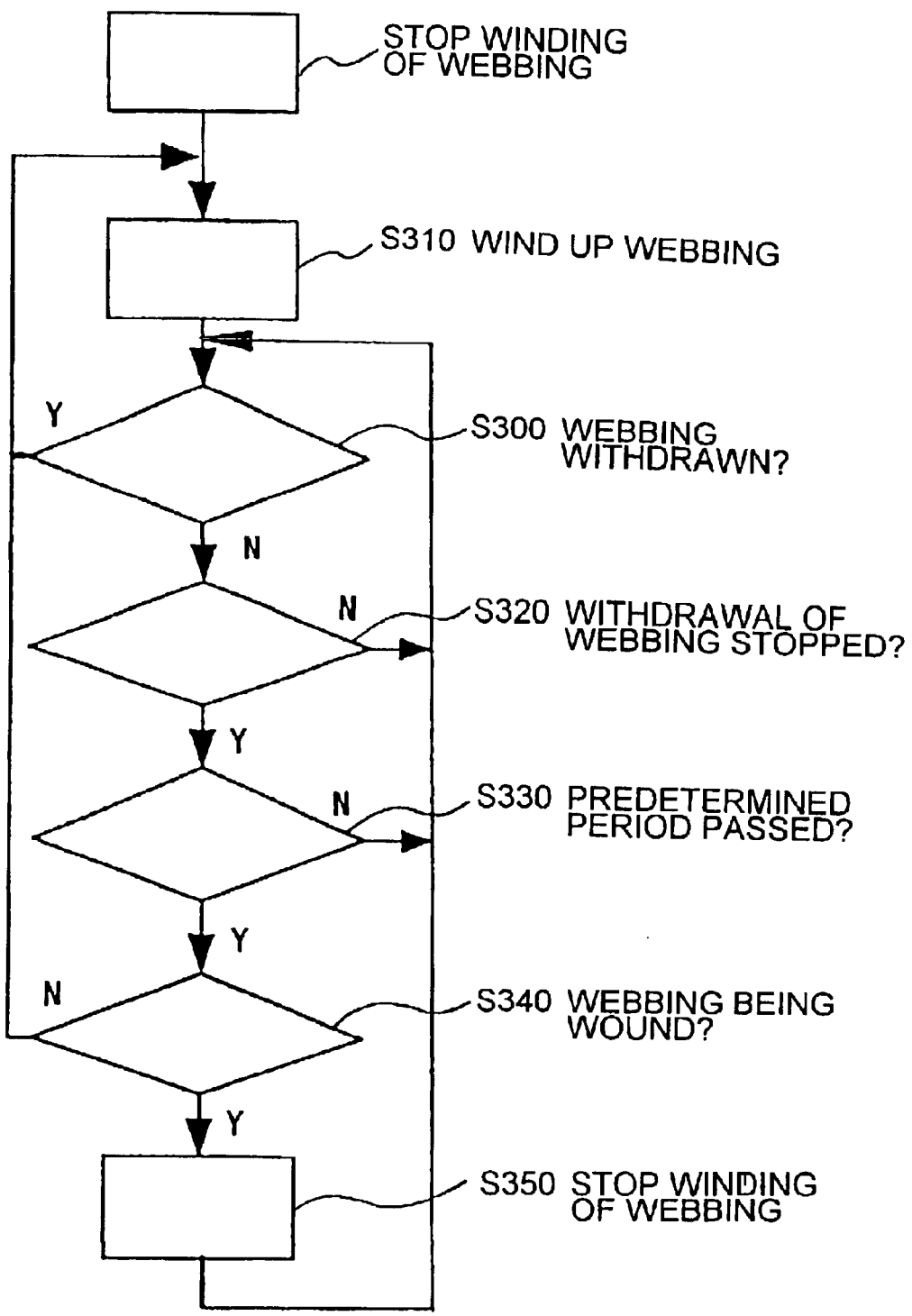
FIG. 18 is a flow chart showing the operational flow for preventing looseness of the webbing while an occupant wears the seat belt.

FIG. 17 is a flow chart showing processes for the respective modes. As a signal of setting one of the modes is inputted to the control circuit from an external sensor or the like during running of the vehicle or while the child seat is fixed, the speed and/or the time period for winding up the webbing is set corresponding to the mode (Step 310, Step 320, Step 330). For switching the speed-reduction mechanism 10, the train change is started (solenoid of the pawl mechanism 70 is excited), so that the rotational torque of the motor is transmitted to the spool 2 through the second reduction gear mechanism 10B (Step 340). The winding of the webbing W is performed in the mode (Step 350). In case a signal for cancelling the aforementioned mode or a signal indicating that the safety is ensured is inputted, the train change is finished (Step 370).

As the child seat switch is turned ON for mounting the child seat, the train change is started to wind up the webbing W for a predetermined period (Step 400 to Step 420). In case of taking off the child seat, the buckle switch is turned OFF when the tongue is disengaged from the buckle (Step 430). The train change is finished (Step 370) when it is detected that the buckle switch is turned OFF, so that the mode is returned to the comfort mode of slowly winding the webbing.

In the hold mode or in the warning mode, the speed of the motor is preferably set to provide a medium rotational torque. In the pretensioning mode, the speed of the motor is preferably set to provide a large rotational torque.

Figure 19:
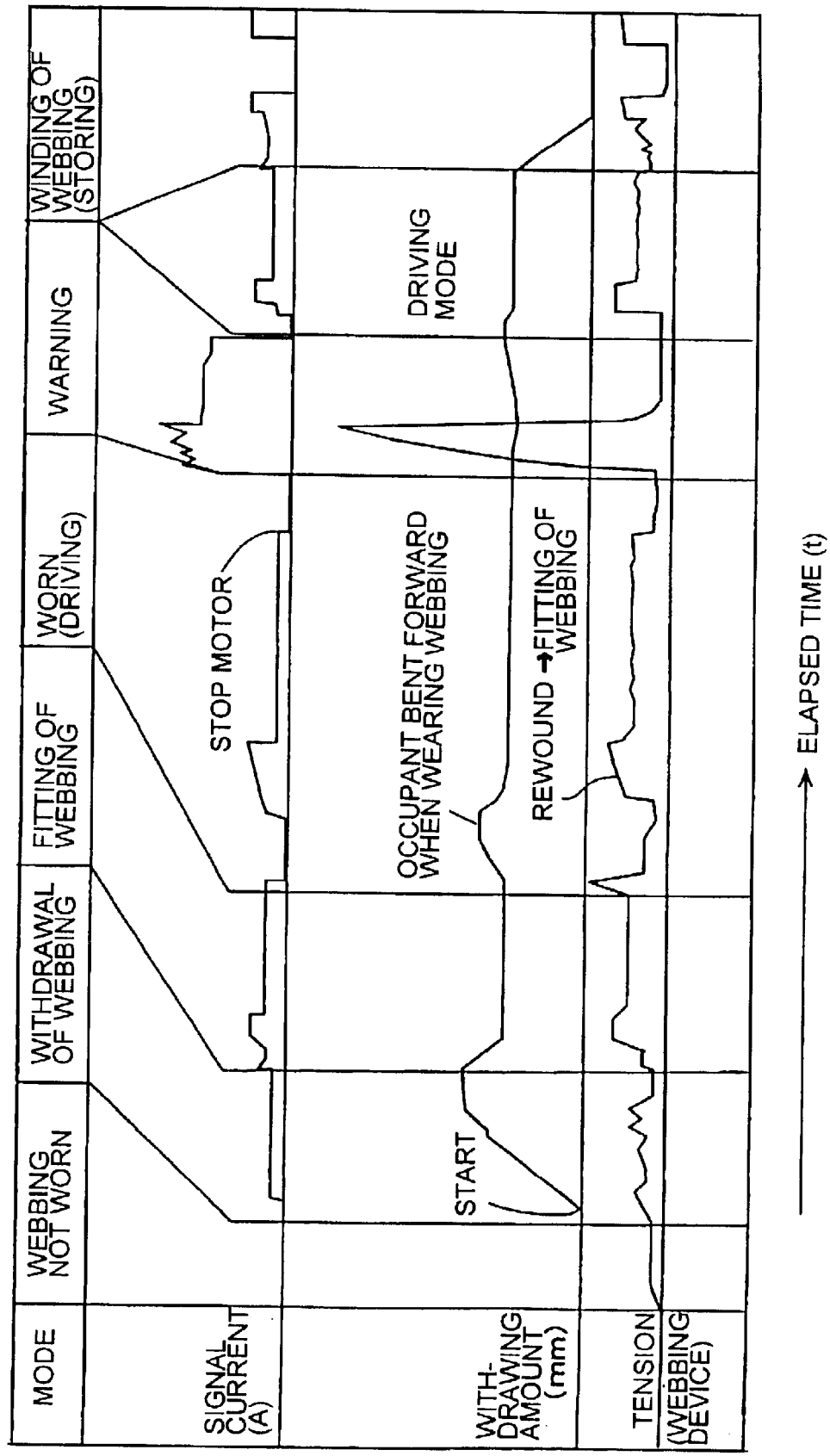
FIG. 19 is a variation diagram showing a relation among a signal current, unwound amount of the webbing, and tension for winding up the webbing in each mode of winding the webbing.
Figure 20:
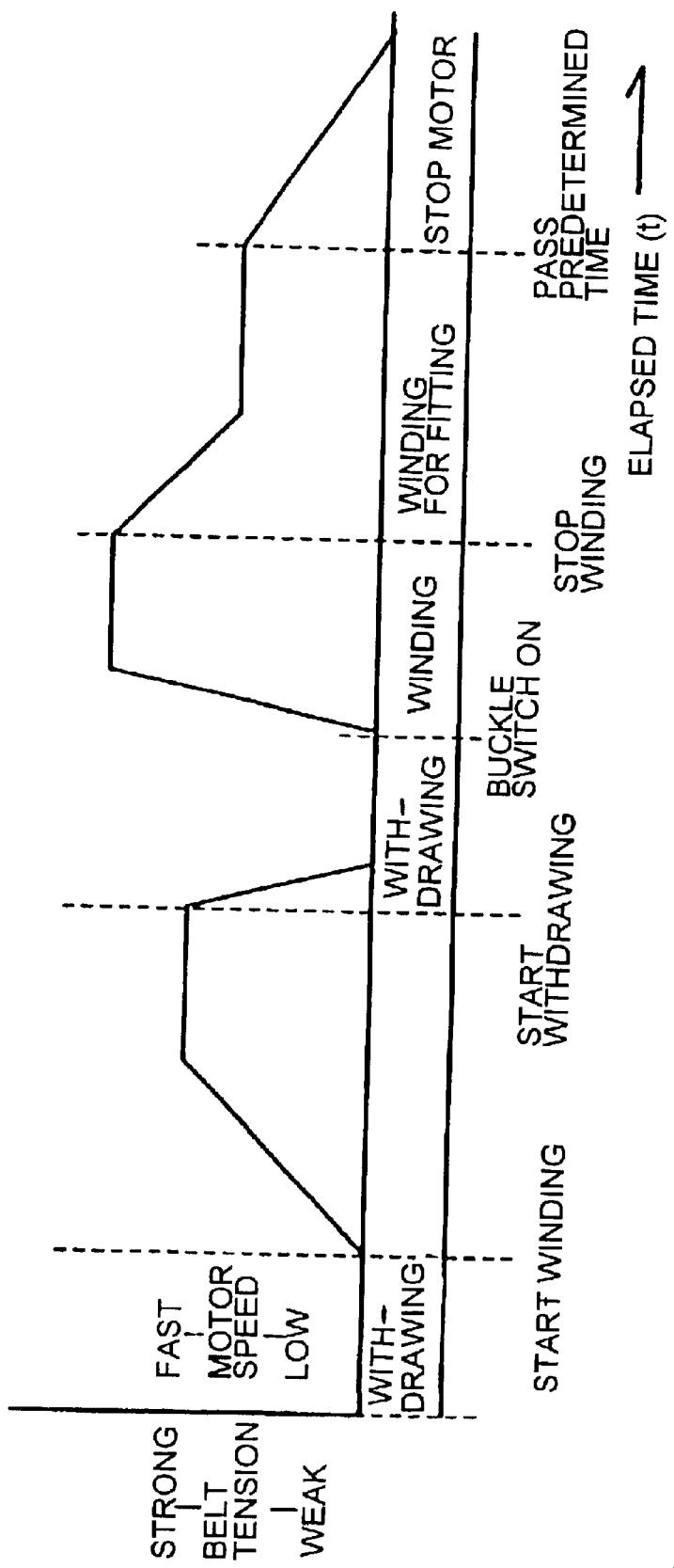
FIG. 20 is a variation diagram showing the controlling state of the motor speed corresponding to the withdrawal or retraction of the webbing.

FIG. 19 is a variation diagram indicating conditions for winding the webbing, schematically showing the relation among the signal current for driving the motor for winding the webbing, the withdrawing amount of the webbing, and the tension for winding up the webbing into the retractor, which are measured to be fed back to the control circuit. The abscissa of this diagram indicates elapsed time (t) which is scaled for roughly showing the elapsed time relative to the movement of the occupant and to the state of the vehicle. Among the curves in the diagram, a signal current curve indicates the state of driving of the motor, a withdrawing amount curve indicates the movement of the webbing withdrawn from the retractor, and a tension curve indicates a pulling force by the occupant and a winding force by the operation of the motor. As apparent from the diagram, the operation of the motor is controlled according to the state of the webbing withdrawn from the retractor, thereby suitably controlling the tension of the webbing.

Hereinafter, variations of the entire structure and the respective components of the speed-reduction mechanism 10 will be described.

FIG. 21(*a*) through FIG. 21(*e*) are schematic explanatory views showing variations of the entire structure of the speed-reduction mechanism 10.

In FIG. 21(*a*), the first reduction gear mechanism 10A and the second reduction gear mechanism 10B are separately disposed and the transmission of the rotational torque of the motor 5 is allowed to be switched by shifting the switch gear 70. The shift of the switch gear 70 is achieved by sliding its shaft or moving the switch gear 70 along the shaft. In this case, since the slip mechanism 60 does not effect the second reduction gear mechanism 10B, a large rotational torque can be effectively outputted. The switching between the train through the slip mechanism 60 and the train through the second gear mechanism 10B for transmitting the rotational torque of the motor 5 may be performed by the operation of a solenoid 71 as shown in FIG. 21(*b*) instead of the switch gear. FIG. 21(*c*) shows a variation in which the switch gear 70 is disposed between the second reduction gear mechanism 10B and the slip mechanism 60. As shown in FIG. 21(*d*), the switching of the train for the motor may be performed directly between the first reduction gear mechanism 10A and the second reduction gear mechanism 10B and the connection between the spool 2 and the slip mechanism 60 can be established or cut by the solenoid 71.

FIG. 21(*e*) shows a variation of the speed-reduction mechanism comprising a single train in which the rotational torque of the motor 5 is transmitted to the spool 2 through the first reduction gear mechanism 10A and the slip mechanism 60. Because in this mechanism, weight is given to the operation ability in tile comfort mode, it is preferable that the operation of winding up the webbing with a large torque in the event of emergency is performed by other biasing means.

FIGS. 22(*a*) through 22(*c*) are schematic explanatory views showing variations of the first reduction gear mechanism 10A. On the basis of its function for securely transmitting the rotational torque from the shaft of the motor to the output shaft 25, such as a shaft for winding up the webbing, a pulley 6P is disposed to oppose the shaft of the motor to transmit the torque of the motor to the output shaft 25 of the speed-reduction mechanism through a transmitting belt 22 (see FIG. 22(*a*)).

Employed as the transmitting belt 22 include a timing belt, belts having various section (V, plane), a resin wire, a steel wire, a chain and the like.

As a speed-reduction mechanism, a planetary gear unit 23 may be employed. In this case, a planetary gear side (carrier 23*a*) for supporting the planetary gears or internal teeth of an internal gear 23*b* is an input shaft, so that the torque from the input shaft can be transmitted to the output shaft 25 (see FIGS. 22(*b*), 22(*c*)).

The mechanism for switching from the train through the first reduction gear mechanism to the train through the second reduction gear mechanism to obtain large torque will be described. FIG. 23(*a*) shows a variation in which the carrier of the planetary gear unit 23 is locked so as to output the input from the sun gear to the output shaft through the internal teeth of the internal gear 23*b*. FIGS. 23(*b*) and 23(*c*) show a variation in which the transmission from the input 24 to the output 25 coaxially arranged is achieved by an intermediate gear 26. The intermediate gear 26 can be shifted by a clutching operation. The input shaft 24 and the output shaft 25 may be arranged to have different axes to compose a gear train through the intermediate gear 26.

Figure 24A:
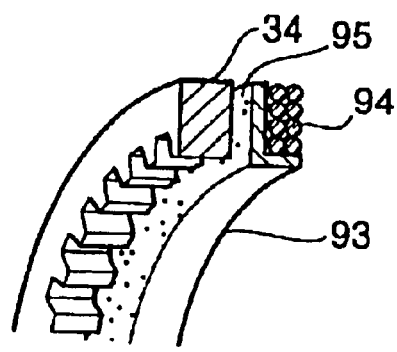
FIGS. 24(a) and 24(b) are explanatory views schematically showing variations of a switching mechanism of the speed-reduction mechanism.
Figure 24B:
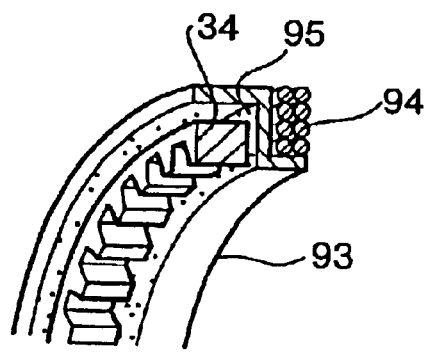
Figure 25A:
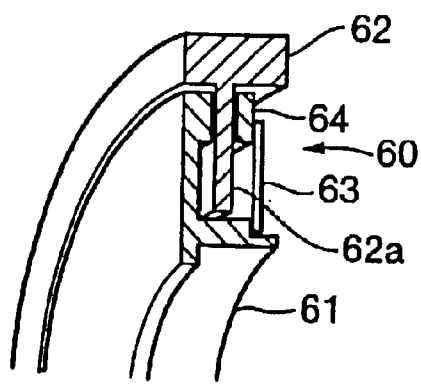
FIGS. 25(a)–25(d) are explanatory views schematically showing variations of a slip mechanism.
Figure 25B:
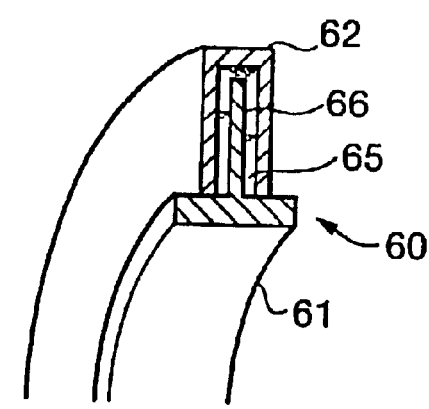
Figure 25C:
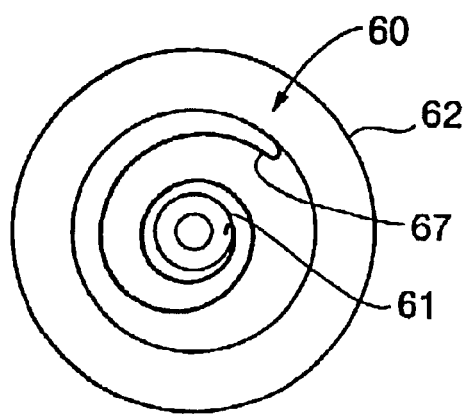
Figure 25D:
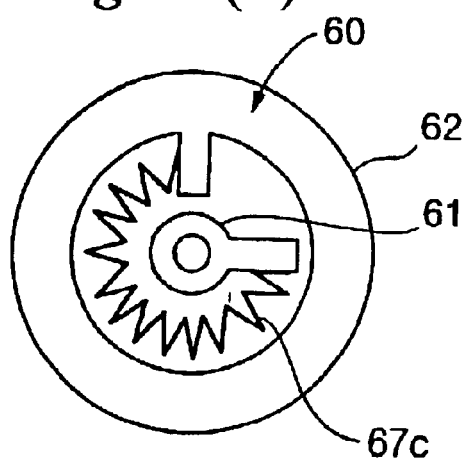
Figure 26A:
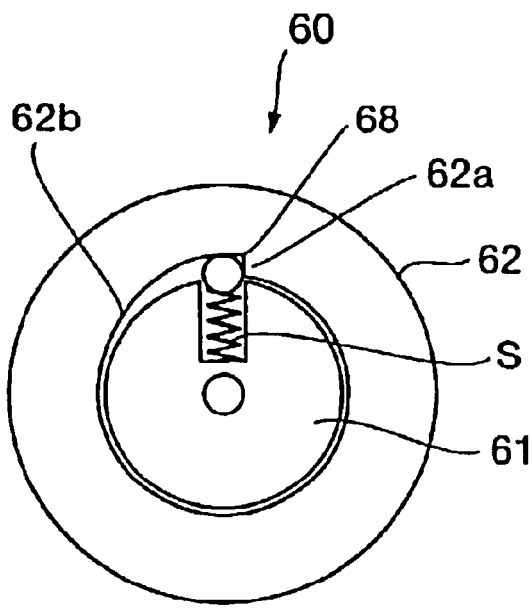
FIGS. 26(a)–26(d) are explanatory views schematically showing variations of the slip mechanism.
Figure 26B:
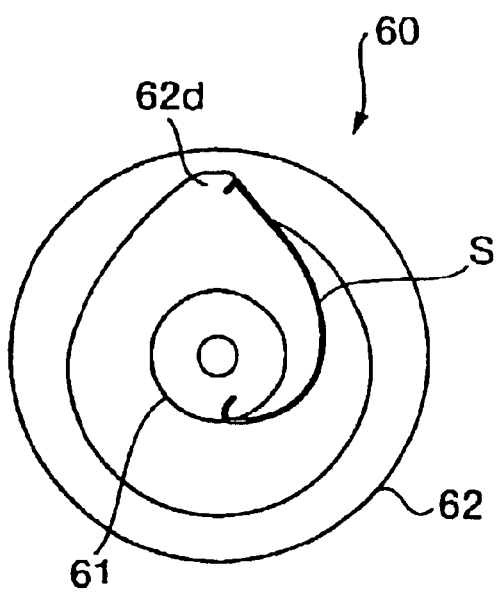
Figure 26C:
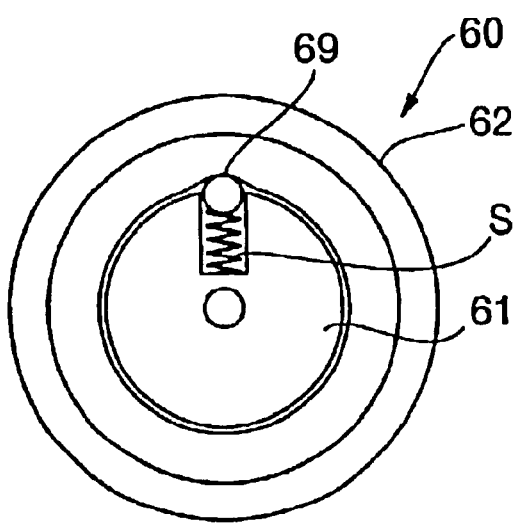
Figure 26D:
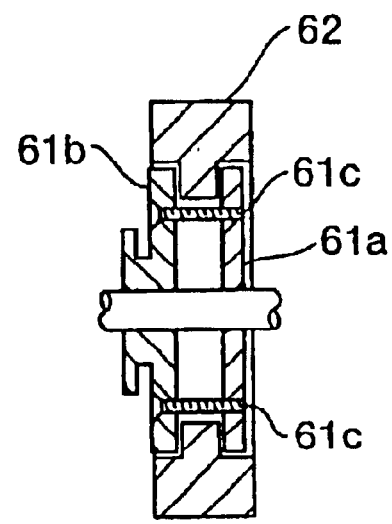

FIGS. 24(*a*) and 24(*b*) show examples of a magnetic-particle clutch in which magnetic particles 95 are filled in a space between the internal gear 34 and a flange 93, which has substantially the same diameter as the internal gear 34 and is disposed adjacent to the internal gear 34, and an electromagnetic coil 94 is guided by the flange 93 to be wound therearound. In this magnetic-particle clutch, the coil 94 is excited to make the magnetic particles in the solid state, thereby locking the rotation of the internal gear 34. FIG. 24(*a*) shows an example in which the magnetic-particle clutch is arranged along a side surface of the internal gear 34, and FIG. 24(*b*) shows an example in which the magnetic-particle clutch is arranged along the outer periphery of the internal gear 34.

Now, a variation of the slip mechanism 60 will be described. Though the slip mechanism 60 using the rotary damper 17 is employed in this embodiment, variations using a frictional mechanism or a spring biasing mechanism as a torque limiter may also be employed. FIG. 25(*a*) shows a slip mechanist 60 in which disks are prevented from rotating with a torque less than a predetermined torque by a plate spring 63. The plate spring 63 is attached to a flange of an inner disk 61 and is provided with a brake pad 64 attached to its end. The brake pad 64 presses a flange 62*a* of an outer disk 62 so as to apply slide resistance. Therefore, the inner and outer disks 61, 62 rotate together until the torque of the outer disk 62 exceeds a predetermined value. FIG. 25(*b*) shows a variation in which a ring-like vane 66 is provided on the outer periphery of the inner disk 61. The outer disk 62 has a ring-like oil chamber 65 in which silicone oil is sealed, and the ring-like vane 66 is arranged coaxially with the outer disk 62. In this case, also, the inner and outer disks 61, 62 rotate together until the viscosity resistance developed by the vane and oil around it exceeds a predetermined value.

As shown in FIG. 25(*c*), a slip mechanism 60 may be arranged and formed as an outer ring, and a spiral spring 67 is arranged to be compressed within an inner space of the slip mechanism 60. With this structure, a rotational torque by the biasing force of the spiral spring 67 is transmitted to an outer ring 62 until exceeding a predetermined torque. After exceeding the predetermined torque, the slip mechanism 60 shuts off the rotational torque developed by the biasing force. As shown in FIG. 25(*d*), instead of the spiral spring 67, a compressed spring coil 67 may be employed to exhibit its biasing force according to a predetermined rotational angle.

FIGS. 26(*a*) through 26(*d*) show examples of a slip mechanism 60 disposed between an outer disk 62 and an inner bush 61 arranged coaxially with the outer disk 62. In the slip mechanism 60 shown in FIG. 26(*a*), the outer disk 62 is provided with a transfer curve 62*b* corresponding to ¼ circle and a step portion 62*a* on the inner periphery thereof, and a steel ball 68 is housed at the terminal end of the transfer curve 62*b*. The inner bush 61 is provided with a radially extending notch in which a spring S is placed. By the spring S, the steel ball 68 is held at the terminal end of the transfer curve 62*b*. In the slip mechanism 60, the steel ball 68 does not pass over the step portion 62*a* so that the inner bush 61 and the outer disk 62 rotate together when the torque is smaller than a preset value. As the rotational torque exceeding the preset value is applied, the steel ball 68 passes over the step portion 62*a*, travels for a full circle along the inner periphery of the outer disk 62 with being pressed by the spring S and enters in the position at the terminal end again.

FIG. 26(*b*) shows a variation in which a spring S as a torque limiter is compressed between a small-diameter inner bush 61 and an outer disk 62. As shown in this figure, the outer end of the spring S is inserted into a recess 62*d* formed in the inner periphery of the outer disk 62 and does not come off the recess 62*d* with bending of the spring caused by torque less than a preset torque. Therefore, the inner bush 61 and the outer disk 62 rotate together. As the rotational torque applied exceeds a preset value, the outer end of the spring S slides along the inner periphery of the outer disk 62. After the terminal end slides for a full circle, the terminal end enters into the recess 62*d* again.

FIG. 26(*c*) shows a slip mechanism 60 similar to that shown FIG. 26(*a*). In this slip mechanism 60, an elastic ball 69 is employed. The elastic ball 69 is deformed in the radial direction and pressed against the inner periphery of the outer disk 62 by pressure of the spring S. As a rotational torque exceeding the preset value is developed between the inner bush 61 and the outer disk 62, the elastic ball 69 is shear-deformed to cancel the engagement between the inner bush 61 and the outer disk 62, so that the inner bush 61 and the outer disk 62 separately rotate.

FIG. 26(*d*) shows a variation of the slip mechanism shown in FIG. 25(*a*). The flange of the outer disk 62 is clamped between two inner bushes 61*a* and 61*b*, wherein the distance between them can be controlled by screws 61*c* so as to obtain desired resistant torque. If necessary, springs (not shown) may be attached to the screws 61*c* for controlling the pressure on the disk of the inner bush 61.

Variations of the webbing withdrawal detecting unit 40 will be described now. Instead of the fan-like switch plate 41 (see FIG. 8), variations of a switch detecting the webbing withdrawal are shown in FIGS. 27(*a*) and 27(*b*).

Figure 27A:
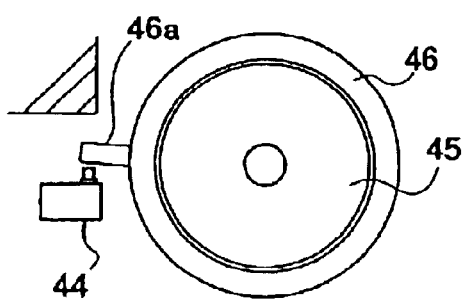
FIGS. 27(a) and 27(b) are explanatory views schematically showing variations of a webbing withdrawal detecting unit.
Figure 27B:
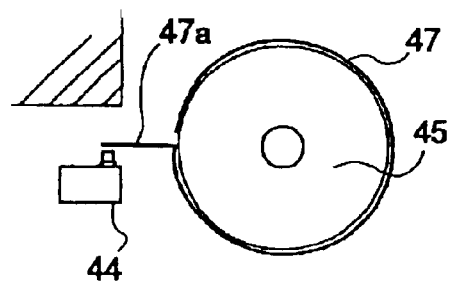

FIG. 27(*a*) shows a withdrawal detecting unit 40 comprising a ring 46 provided with a trigger projection 46*a* formed on the periphery thereof and a bush 45 which can rotate relative to the ring 46 with a predetermined resistance. The bush 45 directly rotates by the rotation of the spool (not shown). When the rotational torque is less than the resistance, the ring 46 rotates together with the bush 45. A limit switch 44 is turned ON by the trigger projection 46a. FIG. 27(b) shows a withdrawal detecting unit for turning ON the limit switch 44 in which a ring-like spring 47 functioning as a cramping ring is fitted onto the bush 45, and the limit switch 44 is turned on by the integral rotation of the bush 45 and the spring 47 with the aid of friction between the bush 45 and the biasing force of the spring 47. Instead of the known-type limit switch used in this embodiment, a normal contact switch may be used. Further, a photodetector may be used. In this case, a slit is formed in a switch plate or a ring and the switch plate or the ring rotates so that the photodetector receives light passing through the slit. Alternatively, a proximity sensor of sensing metal which can detect the movement of a metallic switch plate or a metal ring or a Hall element which can detect change in magnetic field may be used.

The spool rotation detecting unit will be described hereinafter. In the spool rotation detecting unit, instead of the aforementioned variable resistor for directly detecting change in voltage, a photodetector of encoder type, a photodetector for detecting the position of the slit which can used also for the withdrawal detecting unit, a proximity sensor, or a magnetic detector for reading a position by a magnetic head may be used.

Though the DC (direct current) motor is used as a motor in this embodiment, various known servo motors which are variable speed motors may be used. For example, a stepping motor, an ultrasonic motor, an AC motor may be used with a corresponding motor driving circuit, thereby achieving the winding operation as mentioned above. It is preferable by the reason of wiring harness that the control circuit for driving the motor is positioned in a space below the webbing winding-up portion created when the motor is assembled in such a manner that the control circuit is disposed adjacent to the motor. However, the motor may be positioned in any suitable place in a frame.

As described above, the present invention can provide seat belt winding functions suitable for various conditions of the occupant. These functions are set at standard values in shipping from a factory. An occupant can simulate these modes (simulating function) so as to change the effects of the functions to prefer degrees. This operation can be performed by using a display of a navigation system installed in the vehicle or using an exclusive controller.

In addition to a function of providing alarm sounds and messages in the warning mode and the pretensioning mode, a function of providing various sounds or displaying operation confirmation images may also be added in the comfort mode, thereby improving the operation ability.

These settings may be made via harnesses arranged in the vehicle so that a driver's seat is set separately from other seats or all of the seats are set to the same. These settings for the respective seats may be made through telecommunication lines. For example, the setting mode of the retractors for the respective seats can be set corresponding to commands which are inputted by the driver or another occupant with the aforementioned display or a remote controller via telecommunication lines using any known protocols. Data used for these settings may include IDs for specifying the seats and commands for setting the respective modes (warning, holding, pause (waiting), releasing, child seat fixing).

As described above, a retractor of this invention can provide suitable states of winding up a webbing corresponding to various conditions by controlling the state of a single motor having a speed-reduction mechanism with high adaptability or by combination of such a motor with a known retractor, thereby securely providing comfort and safety for an occupant.

While the invention has been explained with reference to the specific embodiments of the invention, the explanation is illustrative and the invention is limited only by the appended claims.

What is claimed is:

1. A seat belt retractor, comprising:
a base frame,
a spool having a spool shaft journalled to the base frame,
a webbing wound around the spool,
a return spring connected to the spool for winding the webbing by a return force thereof,
an electric motor having a driving gear at one end, and
a contrate gear directly engaging the driving gear of the motor and being arranged such that said spool shaft passes through the contrate gear, said contrate gear and the driving gear operating as a speed-reduction mechanism interposed between the motor and the spool and winding the webbing at a low speed for fitting the webbing to an occupant so that the webbing is wound by operation of the motor via the contrate gear.

2. A seat belt retractor according to claim 1, wherein said contrate gear has cone-shaped teeth with a constant pitch.

3. A seat belt retractor according to claim 2, wherein said motor has an elongated shape and is arranged perpendicular to the spool shaft to engage the cone-shaped teeth.

4. A seat belt retractor according to claim 3, wherein said spool shaft passing through the contrate gear has an end fixed to the return spring.

* * * * *